United States Patent
Liang

(10) Patent No.: US 12,147,273 B2
(45) Date of Patent: Nov. 19, 2024

(54) VIDEO CALL DISPLAY METHOD APPLIED TO ELECTRONIC DEVICE AND RELATED APPARATUS

(71) Applicant: Huawei Technologies Co., Ltd., Shenzhen (CN)

(72) Inventor: Haowei Liang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 329 days.

(21) Appl. No.: 17/631,190

(22) PCT Filed: Jul. 17, 2020

(86) PCT No.: PCT/CN2020/102543
§ 371 (c)(1),
(2) Date: Jan. 28, 2022

(87) PCT Pub. No.: WO2021/017889
PCT Pub. Date: Feb. 4, 2021

(65) Prior Publication Data
US 2022/0276680 A1    Sep. 1, 2022

(30) Foreign Application Priority Data
Jul. 30, 2019  (CN) .......................... 201910693779.2

(51) Int. Cl.
*G06F 1/16* (2006.01)
*H04M 1/72439* (2021.01)
*H04M 1/72448* (2021.01)

(52) U.S. Cl.
CPC .......... *G06F 1/1677* (2013.01); *G06F 1/1641* (2013.01); *H04M 1/72439* (2021.01); *H04M 1/72448* (2021.01)

(58) Field of Classification Search
CPC .... G06F 1/1677; G06F 1/1641; G06F 1/1616; G06F 2203/04803; G06F 1/1652;
(Continued)

(56) References Cited

U.S. PATENT DOCUMENTS 9,891,663 B2    2/2018  Park et al.
11,048,379 B2 * 6/2021  Cheong ................. G06F 1/1647
(Continued)

FOREIGN PATENT DOCUMENTS

CN    107632895 A    1/2018
CN    107704177 A    2/2018
(Continued)

*Primary Examiner* — Kenneth T Lam
(74) *Attorney, Agent, or Firm* — Conley Rose, P.C.

(57) ABSTRACT

A video call display method applied to an electronic device includes the electronic device receiving a video call request while displaying an application interface. After a user answers the video call request, the electronic device displays a call interface in full screen. When a bending operation entered of the user is received on the electronic device, the electronic device displays the call interface on a first screen of a display, and displays, on a second screen of the display, an application interface displayed by the electronic device before answering a video call, the displaying on the first screen and the second screen allows, during the video call, the user to open the application interface displayed by the electronic device before answering the video call.

20 Claims, 27 Drawing Sheets

(58) Field of Classification Search
CPC .... G06F 3/0488; G06F 3/1423; G06F 3/1446; H04M 1/72439; H04M 1/72448; H04M 1/0268; H04M 1/0214; H04M 1/72469; G09G 2340/14; G09G 2354/00; G09G 2356/00; G09G 2380/02; G09G 3/035; H04N 7/142; H04N 2007/145; H04N 7/147; H04N 7/141

See application file for complete search history.

(56) References Cited

U.S. PATENT DOCUMENTS

| | | | |
|---|---|---|---|
| 2009/0046075 | A1 | 2/2009 | Kim et al. |
| 2013/0321340 | A1 | 12/2013 | Seo et al. |
| 2016/0034047 | A1* | 2/2016 | Lee ................. G06F 3/0484 345/156 |
| 2016/0085319 | A1* | 3/2016 | Kim ................. H04M 1/0268 345/156 |
| 2017/0147189 | A1 | 5/2017 | Ryu et al. |
| 2017/0345351 | A1 | 11/2017 | Kwon et al. |
| 2018/0039387 | A1* | 2/2018 | Cheong ............. G06F 1/3215 |
| 2019/0042066 | A1* | 2/2019 | Kim ................. H04M 1/725 |
| 2020/0125144 | A1* | 4/2020 | Chung .............. H04M 1/0216 |
| 2020/0310492 | A1* | 10/2020 | Kim .................. H04M 1/0245 |
| 2021/0157460 | A1* | 5/2021 | Kang ................. G11B 27/34 |
| 2022/0113763 | A1* | 4/2022 | Kim .................. G06F 1/1616 |
| 2023/0247120 | A1* | 8/2023 | Kwon ................ H04M 1/04 455/575.3 |

FOREIGN PATENT DOCUMENTS

| | | |
|---|---|---|
| CN | 107765971 A | 3/2018 |
| CN | 108319338 A | 7/2018 |
| CN | 108762630 A | 11/2018 |
| CN | 109714485 A | 5/2019 |
| CN | 109889630 A | 6/2019 |
| CN | 109917956 A | 6/2019 |
| CN | 110058828 A | 7/2019 |
| CN | 110381282 A | 10/2019 |
| EP | 3979628 A1 | 4/2022 |
| IN | 109218648 A | 1/2019 |
| IN | 109542548 A | 3/2019 |
| KR | 101403839 B1 | 6/2014 |
| WO | 2012108668 A2 | 8/2012 |
| WO | 2014030954 A2 | 2/2014 |
| WO | 2016052814 A1 | 4/2016 |

* cited by examiner

VIDEO CALL DISPLAY METHOD APPLIED TO ELECTRONIC DEVICE AND RELATED APPARATUS

CROSS-REFERENCE TO RELATED APPLICATIONS

This is a U.S. National Stage of International Patent Application No. PCT/CN2020/102543 filed on Jul. 17, 2020, which claims priority to Chinese Patent Application No. 201910693779.2 filed on Jul. 30, 2019, both of which are hereby incorporated by reference in their entireties.

TECHNICAL FIELD

This application relates to the field of electronic technologies, and in particular, to a video call display method applied to an electronic device and a related apparatus.

BACKGROUND

Video calls are a common communication mode in people's lives. Generally, after a user answers a video call, an electronic device displays a video call interface in full screen. For example, in a process of using an application, if the user answers a video call, the electronic device does not display a previous application interface, but displays the video call interface in full screen. In this case, if the user wants to open the previously used application interface while answering the video call (in other words, the electronic device displays the video call interface and the previous application interface in split screen), the user may generally use the following methods:

First, in response to a screen splitting instruction (for example, the user taps a display and then swipes from left to right) entered by the user when the electronic device displays the video call interface, the electronic device displays the video call interface on an upper part of the display, and displays, on a lower part of the display, icons of applications that support a screen splitting function and that are installed on the electronic device. Then, the user needs to find, in the icons of these applications, an icon of a previously used application. Next, the user taps the icon of the previously used application, and the electronic device displays the interface of the previously used application on the lower part of the display, that is, the electronic device displays the interface of the previously used application and the video call interface in split screen. It can be learned that, in this manner of opening an application interface used before answering a video call, the user needs to perform a plurality of operations. This wastes time of the user.

SUMMARY

This application provides a video call display method applied to an electronic device and a related apparatus, so that during a video call, a user can conveniently open an application interface that is being used by the user before answering the video call. This improves operation experience of the user.

According to a first aspect, an embodiment of this application provides a video call display method applied to an electronic device. The electronic device includes a first body, a second body, and a display, the first body is connected to the second body, the first body is bendable relative to the second body, the display is disposed on the first body and the second body, and the method includes: The electronic device displays an application interface in full screen through the display; when the electronic device displays the application interface in full screen, the electronic device receives a video call request; the electronic device receives a first operation of answering the video call request by a first user; the electronic device displays a call interface in full screen in response to the first operation of the first user; when the electronic device displays the call interface, the electronic device receives a second operation of bending the electronic device by the first user; and in response to the second operation of the first user, the electronic device displays the call interface on a first screen of the display, and displays the application interface on a second screen of the display. In this method, during a video call, the user can conveniently open the application interface that is being used by the user before answering the video call. This improves operation experience of the user.

Optionally, the second operation may be bending the electronic device inwardly (in other words, reducing an included angle between the first body and the second body).

With reference to the first aspect, in a possible implementation, when the user bends the electronic device again, the electronic device may display a lock screen on the second screen. In this manner, the second screen may be conveniently locked, and this prevents the user from accidentally touching a control on the second screen.

Optionally, if the user performs another bending operation in a relatively short time after the first bending operation, the electronic device may not lock the second screen.

With reference to the first aspect, in a possible implementation, when the electronic device displays the call interface in full screen, if the electronic device is in a folded state, the electronic device may display, on the first screen, a second image of a second user that is in the call with the first user, and display, on the second screen, a first image of the first user and a call control used to control the video call. Generally, the first screen is more convenient for the user to watch, and the second screen is more convenient for the user to perform a touch operation. In this manner, the first user can conveniently view the image of the second user that is in the call with the first user, and the first user can conveniently perform an operation on the call control displayed on the second screen.

With reference to the first aspect, in a possible implementation, the electronic device may determine, based on a posture of the first body and a posture of the second body, a body whose corresponding display area is the first screen and a body whose corresponding display area is the second screen, that is, determine a body whose corresponding display area is more convenient for the user to watch, and a body whose corresponding display area is more convenient for the user to perform the touch operation.

Specifically, if a first included angle is greater than a second included angle, the electronic device determines that a display area corresponding to the first body is the first screen, and a display area corresponding to the second body is the second screen. The first included angle is an included angle obtained by rotating a normal of the first body clockwise to a direction of gravity, and the second included angle is an included angle obtained by rotating a normal of the second body clockwise to the direction of gravity. If the second included angle is greater than the first included angle, the electronic device determines that the display area on the second body is the first screen, and the display area on the first body is the second screen.

With reference to the first aspect, in a possible implementation, if the electronic device is in the folded state when the video call request is received, the electronic device displays an incoming video call notification interface on the second screen. In this case, display on the first screen may remain unchanged. In this manner, an incoming video call notification does not block the application interface displayed on the first screen, and in addition, the user may conveniently process the incoming video call notification on the second screen.

With reference to the first aspect, in a possible implementation, when the electronic device displays the call interface on the first screen and displays the application interface on the second screen, if no user operation performed on the second screen is detected within a preset time period, and the application interface displayed on the second screen is not a video image being played, the second screen may be locked. In this case, display on the first screen remains unchanged. In this manner, a problem that the electronic device locks a screen on which the video image is being played, so that the user needs to unlock the screen for a plurality of times can be avoided. This improves operation experience of the user.

According to a second aspect, an embodiment of this application provides an electronic device. The electronic device includes a first body, a second body, and a display, the first body is connected to the second body, the first body is bendable relative to the second body, the display is disposed on the first body and the second body, the first body and the second body include one or more memories and one or more processors, the one or more memories are coupled to the one or more processors, the one or more memories are configured to store computer program code, the program code includes computer instructions, and when the one or more processors execute the computer instructions, the electronic device is enabled to perform the following operations: displaying an application interface in full screen through the display; when the electronic device displays the application interface in full screen, receiving a video call request; receiving a first operation of answering the video call request by a first user; displaying a call interface in full screen in response to the first operation of the first user; when the electronic device displays the call interface, receiving a second operation of bending the electronic device by the first user; and in response to the second operation of the first user, displaying the call interface on a first screen of the display, and displaying the application interface on a second screen of the display. This electronic device can be used by a user during a video call to conveniently open an application interface that is being used by the user before answering the video call. This improves operation experience of the user.

Optionally, the second operation may be bending the electronic device inwardly (in other words, reducing an included angle between the first body and the second body).

With reference to the second aspect, in a possible implementation, when the user bends the electronic device again, the electronic device may display a lock screen on the second screen. This electronic device can be used to conveniently lock the second screen, and this prevents the user from accidentally touching a control on the second screen.

Optionally, if the user performs another bending operation in a relatively short time after the first bending operation, the electronic device may not lock the second screen.

With reference to the second aspect, in a possible implementation, if the electronic device is in a folded state, the electronic device displays, on the first screen, a second image of a second user that is in the call with the first user, and displays, on the second screen, a first image of the first user and a call control used to control the video call. Generally, the first screen is more convenient for the user to watch, and the second screen is more convenient for the user to perform a touch operation. In this manner, the first user can conveniently view the image of the second user that is in the call with the first user, and the first user can conveniently perform an operation on the call control displayed on the second screen.

With reference to the second aspect, in a possible implementation, the electronic device may determine, based on a posture of the first body and a posture of the second body, a body whose corresponding display area is the first screen and a body whose corresponding display area is the second screen, that is, determine a body whose corresponding display area is more convenient for the user to watch, and a body whose corresponding display area is more convenient for the user to perform the touch operation. Specifically, if a first included angle is greater than a second included angle, the electronic device determines that a display area corresponding to the first body is the first screen, and a display area corresponding to the second body is the second screen. The first included angle is an included angle obtained by rotating a normal of the first body clockwise to a direction of gravity, and the second included angle is an included angle obtained by rotating a normal of the second body clockwise to the direction of gravity. If the second included angle is greater than the first included angle, the electronic device determines that the display area on the second body is the first screen, and the display area on the first body is the second screen.

With reference to the second aspect, in a possible implementation, if the electronic device is in the folded state when the video call request is received, the electronic device displays an incoming video call notification interface on the second screen. In this case, display on the first screen may remain unchanged. In this manner, an incoming video call notification does not block the application interface displayed on the first screen, and in addition, the user may conveniently process the incoming video call notification on the second screen.

With reference to the second aspect, in a possible implementation, when the electronic device displays the call interface on the first screen and displays the application interface on the second screen, if no user operation performed on the second screen is detected within a preset time period, and the application interface displayed on the second screen is not a video image being played, the electronic device may lock the second screen. In this case, display on the first screen remains unchanged. In this manner, a problem that the electronic device locks a screen on which the video image is being played, so that the user needs to unlock the screen for a plurality of times can be avoided. This improves operation experience of the user.

According to a third aspect, an embodiment of this application provides a computer storage medium, including computer instructions. When the computer instructions are run on an electronic device, the electronic device is enabled to perform the video call display method applied to the electronic device according to any possible implementation of any one of the foregoing aspects.

According to a fourth aspect, an embodiment of this application provides a computer program product. When the computer program product runs on a computer, the computer is enabled to perform the video call display method applied to the electronic device according to any possible implementation of any one of the foregoing aspects.

According to a fifth aspect, an embodiment of this application provides a graphical user interface. The graphical user interface is stored in an electronic device. The electronic device includes a first body, a second body, and a display, the first body is connected to the second body, the first body is bendable relative to the second body, and the display is disposed on the first body and the second body. The electronic device includes one or more memories and one or more processors, and the one or more processors are configured to execute one or more computer programs stored in the memory. The graphical user interface includes: displaying a first graphical user interface in full screen on the display, where the first graphical user interface is an application interface; if the electronic device is in an unfolded state, displaying a second graphical user interface in full screen on the display in response to a first operation of answering a video call request by a first user, where the second graphical user interface includes: a first image of the first user, a second image of a second user that is in a video call with the first user, and a call control used to control the video call, where the first image is displayed over the second image in a superimposed manner; if the electronic device is in a folded state, in response to the first operation, displaying a third graphical user interface on a second screen of the display, and displaying a fourth graphical user interface on a first screen of the display, where the third graphical user interface includes the first image and the call control, and the fourth graphical user interface includes the second image; and in response to a second operation of bending the electronic device by the first user, displaying a fifth graphical user interface on the first screen, and displaying the first graphical user interface on the second screen, where the fifth graphical user interface includes the second image and the call control.

In the embodiments of this application, when an electronic device displays an application interface, a video call request is received. After a user answers the video call request, the electronic device displays a call interface in full screen. In this case, if a bending operation entered by the user on the electronic device is received, the electronic device displays the call interface on a first screen of a display, and displays, on a second screen of the display, an application interface displayed by the electronic device before answering a video call. In this manner, the user can conveniently open the application interface displayed by the electronic device before answering the video call. This improves operation experience of the user.

It may be understood that for beneficial effects that can be achieved by the computer storage medium according to the third aspect, the computer program product according to the fourth aspect, and the graphical user interface according to the fifth aspect, refer to beneficial effects in the corresponding method provided above. Details are not described herein again.

DESCRIPTION OF EMBODIMENTS

The following clearly describes technical solutions of embodiments in this application in detail with reference to the accompanying drawings. In descriptions of the embodiments of this application, unless otherwise specified, "/" indicates "or". For example, AB may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of the embodiments of this application, "a plurality of" means two or more than two.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

Figure 1A:
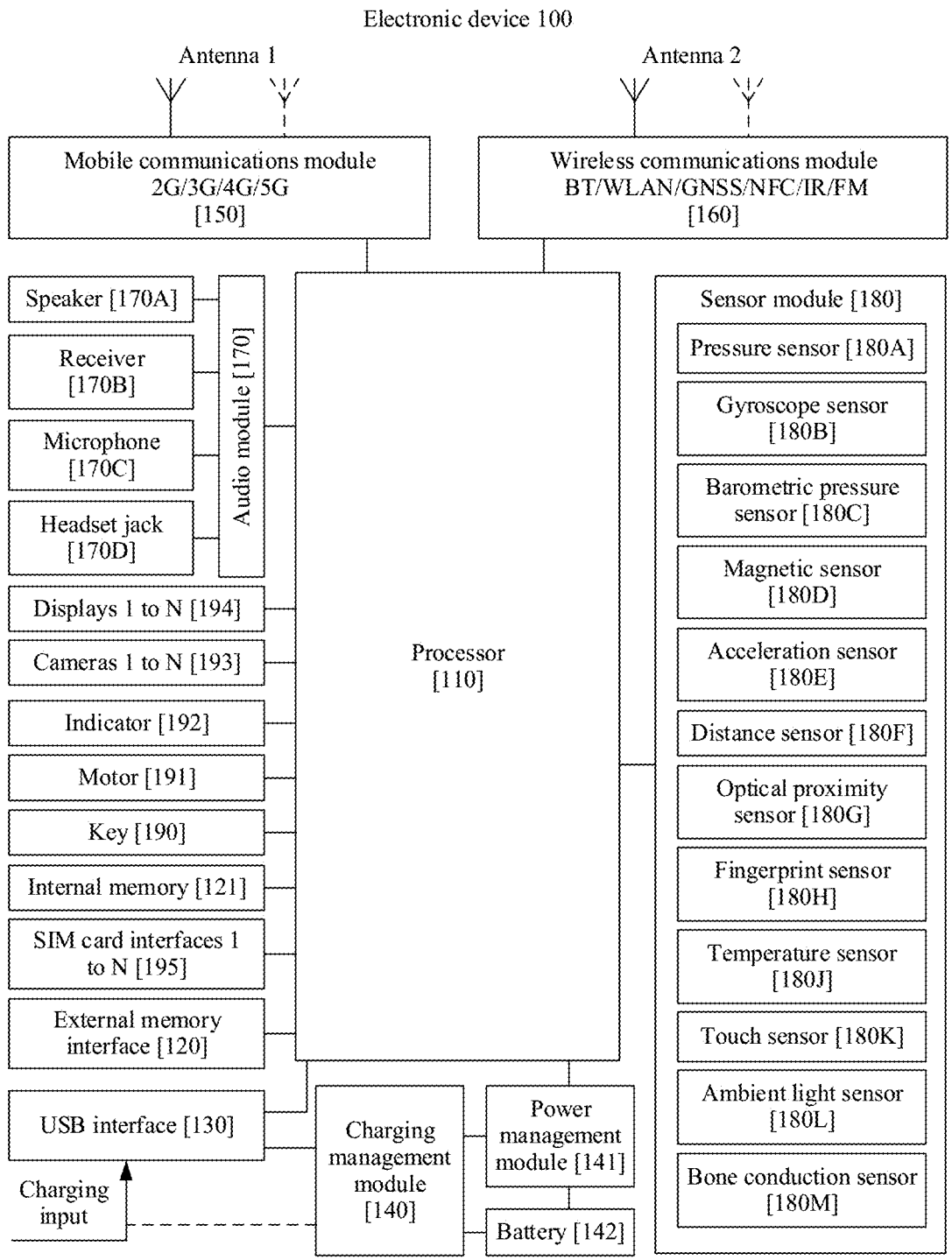
FIG. 1A is a schematic diagram of a structure of an electronic device according to an embodiment of this application.

FIG. 1A is a schematic diagram of a structure of an electronic device 100 according to an embodiment of this application.

The following specifically describes this embodiment by using the electronic device 100 as an example. It should be understood that the electronic device 100 shown in FIG. 1A is merely an example, and the electronic device 100 may have more or fewer components than those shown in FIG. 1A, or two or more components may be combined, or different component configurations may be used. Various components shown in the figure may be implemented in hardware that includes one or more signal processors and/or application-specific integrated circuits, in software, or in a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of the present invention does not constitute a specific limitation on the electronic device 100. In other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU) and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the instructions or the data may be invoked directly from the memory. This avoids repeated access and reduces a waiting time of the processor 110, thereby improving efficiency of the system.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be used to perform audio communication.

The UART interface is a universal serial data bus, and is configured to perform asynchronous communication. The bus may be a bidirectional communications bus. The bus converts to-be-transmitted data between serial communication and parallel communication. In some embodiments, the UART interface is usually used to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, may be configured to transmit data between the electronic device 100 and a peripheral device, or may be configured to connect to a headset for playing audio through the headset. Alternatively, the interface may be configured to connect to another electronic device, for example, an AR device.

It can be understood that an interface connection relationship between the modules shown in this embodiment of the present invention is merely an example for description, and does not constitute a limitation on a structure of the electronic device 100. In other embodiments of this application, the electronic device 100 may alternatively use an interface connection mode different from that in the foregoing embodiment, or use a combination of a plurality of interface connection modes.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device with the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like In some embodiments, the electronic device 100 may include one or N displays 194, where N is a positive integer greater than 1. The electronic device may include one display, or may include a plurality of displays.

Figure 2A:
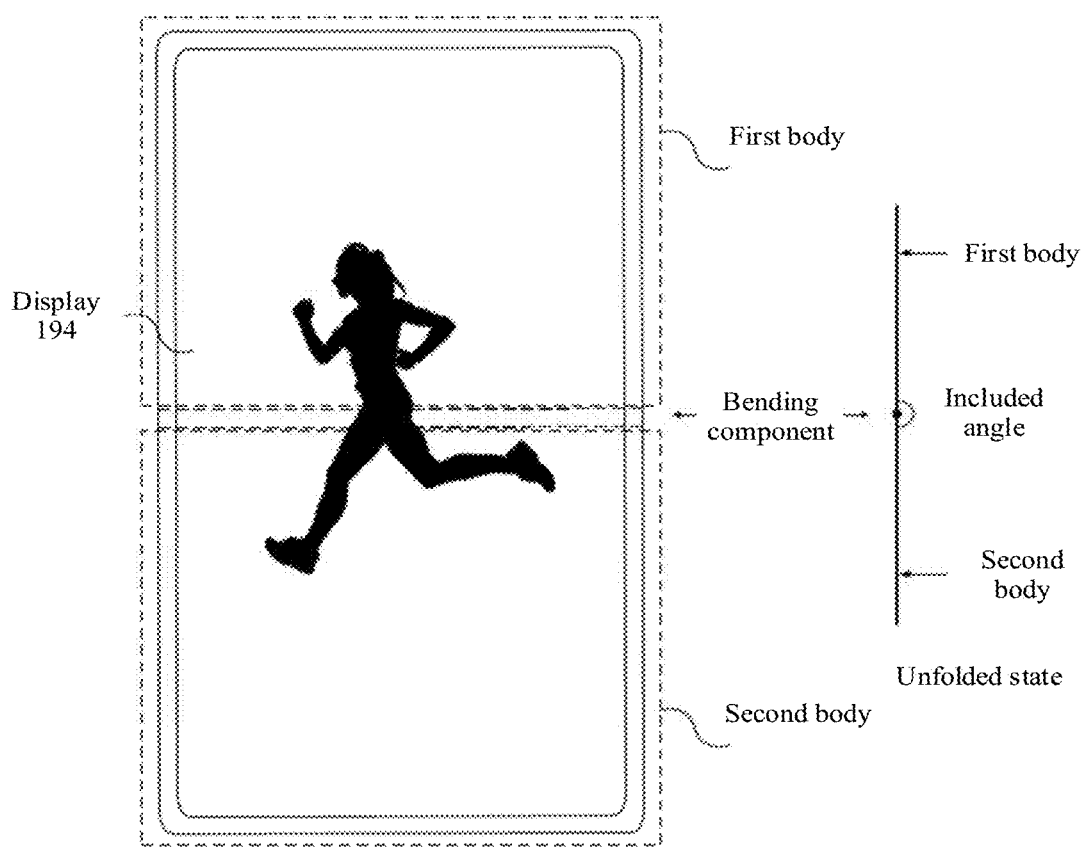
FIG. 2A is a schematic diagram of an electronic device in an unfolded state according to an embodiment of this application.
Figure 2B:
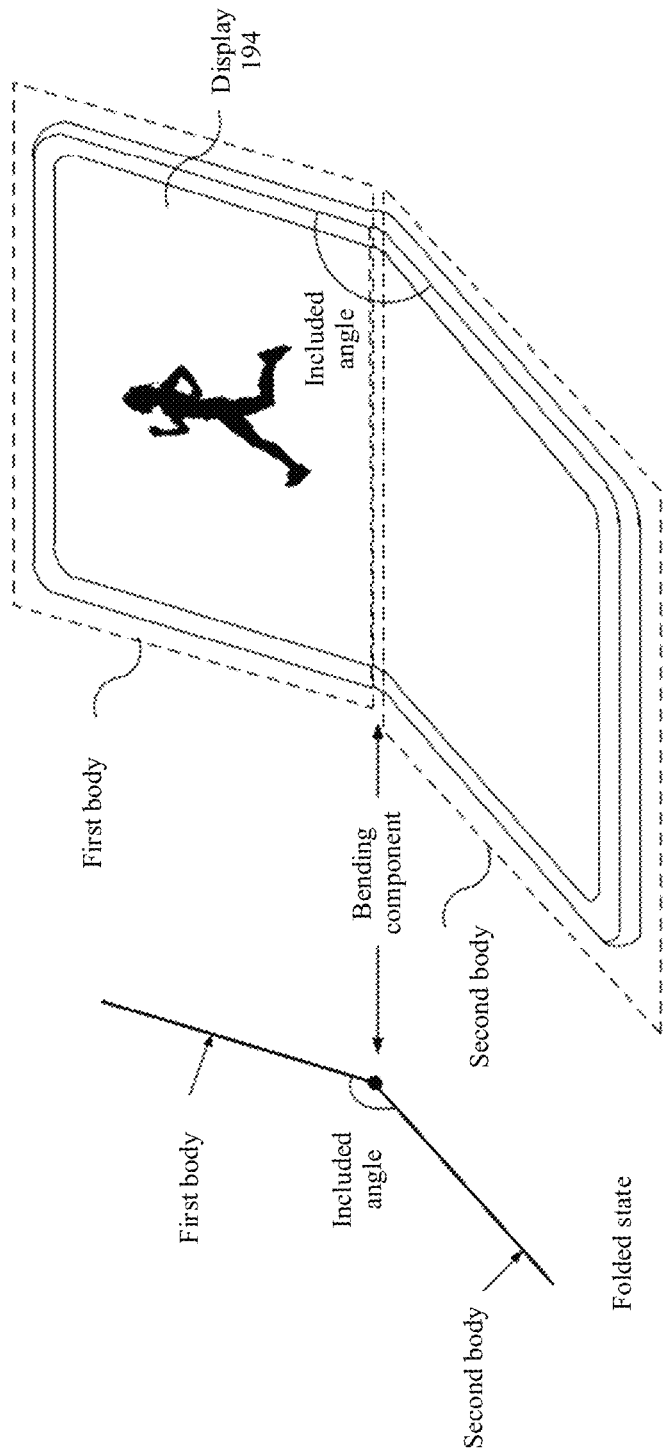
FIG. 2B is a schematic diagram of an electronic device in a folded state according to an embodiment of this application.

The display 194 may be a flexible display or a foldable display. That is, the display 194 may be bent. For example, as shown in FIG. 2A and FIG. 2B, the electronic device includes a first body and a second body, and the first body is connected to the second body by using a bending component. The display 194 is disposed on the first body and the second body. A user may bend the display 194. In this case, an angle of an included angle between the first body and the second body changes.

For example, refer to FIG. 2A and FIG. 2B. The electronic device may be classified into an unfolded state and a folded state based on a degree of bending of the display 194. As shown in FIG. 2A, the electronic device is in an unfolded state. In this case, the included angle between the first body and the second body ranges from 180 degrees to a first angle. For example, the first angle may be 170 degrees. As shown in FIG. 2B, the electronic device is in a folded state. In this case, the included angle between the first body and the second body ranges from 0 degrees to a second angle. It should be noted that the second angle may be equal to the first angle, or the second angle may be less than the first angle. This is not limited in this embodiment of this application.

The electronic device determines, by detecting the included angle between the first body and the second body, whether the electronic device is in the unfolded state or the folded state.

In some embodiments, the electronic device 100 may determine, by using one or more of a gravity sensor, an acceleration sensor, and a gyroscope, whether the electronic device is in the folded state or in the unfolded state. For example, the first body and the second body are separately configured with a sensor (for example, one or more of the gravity sensor, the acceleration sensor, and the gyroscope). The electronic device may determine a posture of the first body and the second body based on the sensor. The electronic device 100 may further detect the included angle between the first body and the second body by using the gravity sensor, the acceleration sensor, and the gyroscope. Then, the electronic device 100 may determine, based on the included angle, whether the electronic device is in the folded state or in the unfolded state. Optionally, the electronic device 100 may further determine the posture of the first body and/or the second body by using one or more of the gravity sensor, the acceleration sensor, and the gyroscope, and then perform landscape and portrait screen switching.

In some other embodiments, the electronic device 100 may further include an angle sensor (not shown in FIG. 1A), and the angle sensor may be disposed on the bending component. The electronic device 100 may determine, by using the angle sensor (not shown in FIG. 1A) disposed on the bending component, whether the electronic device is bent, and measure the included angle between the first body and the second body. Specifically, when the included angle ranges from 180 degrees to the first angle, the electronic device 100 may identify, by using the angle sensor, that the electronic device is in the unfolded state. When the included angle ranges from 0 degrees to the second angle, the electronic device 100 may identify, by using the angle sensor, that the electronic device is in the folded state.

In some other embodiments, the electronic device 100 may also identify, by using a physical switch disposed on the bending component, whether the electronic device is in the folded state. For example, when the electronic device receives a bending operation of the user, the physical switch disposed on the electronic device is triggered to be turned on, and the electronic device 100 may determine that the electronic device 100 is in the folded state. When the electronic device 100 receives an unfolding operation of the user, the physical switch disposed on the electronic device is triggered to be turned off, and the electronic device may determine that the electronic device is in the unfolded state. The foregoing example is merely used to explain this application and shall not be construed as a limitation.

Figure 2C:
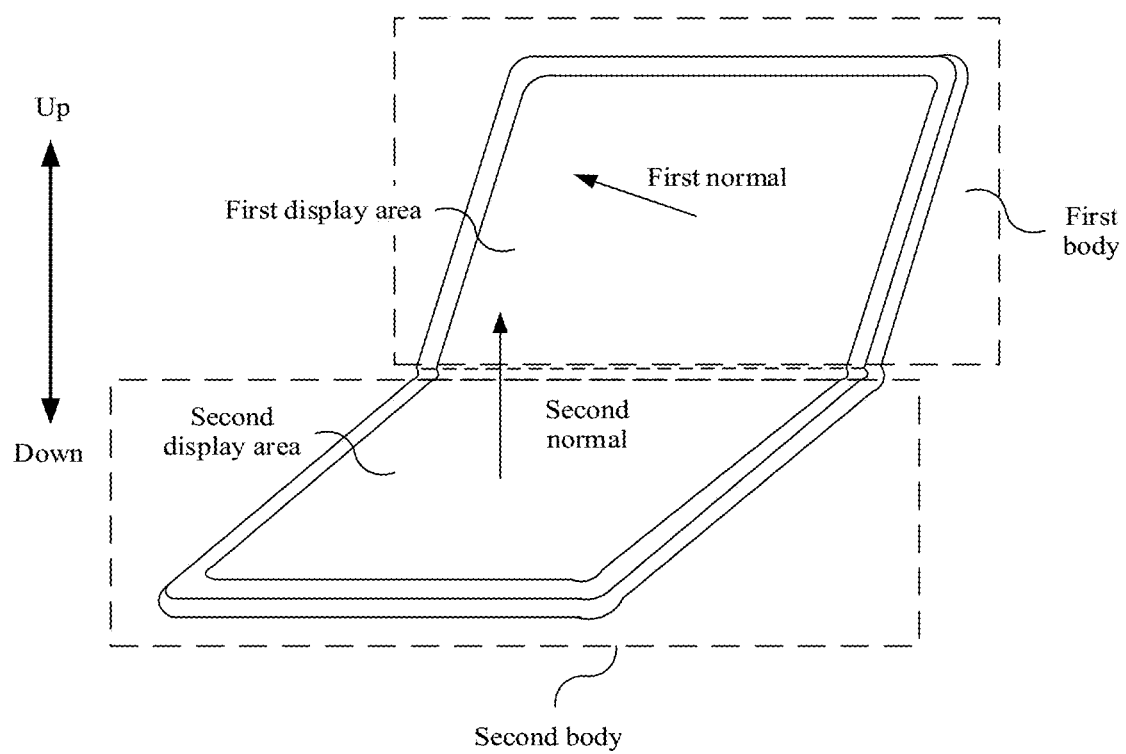
FIG. 2C is a schematic diagram of a first normal and a second normal according to an embodiment of this application.

When the electronic device is in the folded state, the display is divided into two display areas by using the bending component as a boundary. FIG. 2C is a schematic diagram of two display areas in the display according to this embodiment of this application. A display area on the first body is a first display area, and a display area on the second body is a second display area.

In some other embodiments, when the electronic device is in the folded state, the electronic device may display content only in some areas of the display 194, or may display content in all areas of the display 194. For example, refer to FIG. 2C. Interface content may be output only in the first display area, and the second display area may be in a screen-off state, that is, display no interface element. In another implementation, the second display area may be further configured to display a date, a time, and the like.

The electronic device may determine a first screen and/or a second screen based on the posture of the first body and the second body. The first screen is mainly for display, and the second screen is mainly for operation. To be specific, the electronic device may determine, based on the posture of the first body and the second body, a body whose corresponding display area is convenient for the user to watch, and a body whose corresponding display area is convenient for the user to perform an operation. For example, when the first body and the second body are in a posture shown in FIG. 2B, the first display area is convenient for the user to watch, and the second display area is convenient for the user to perform an operation.

Figure 2D:
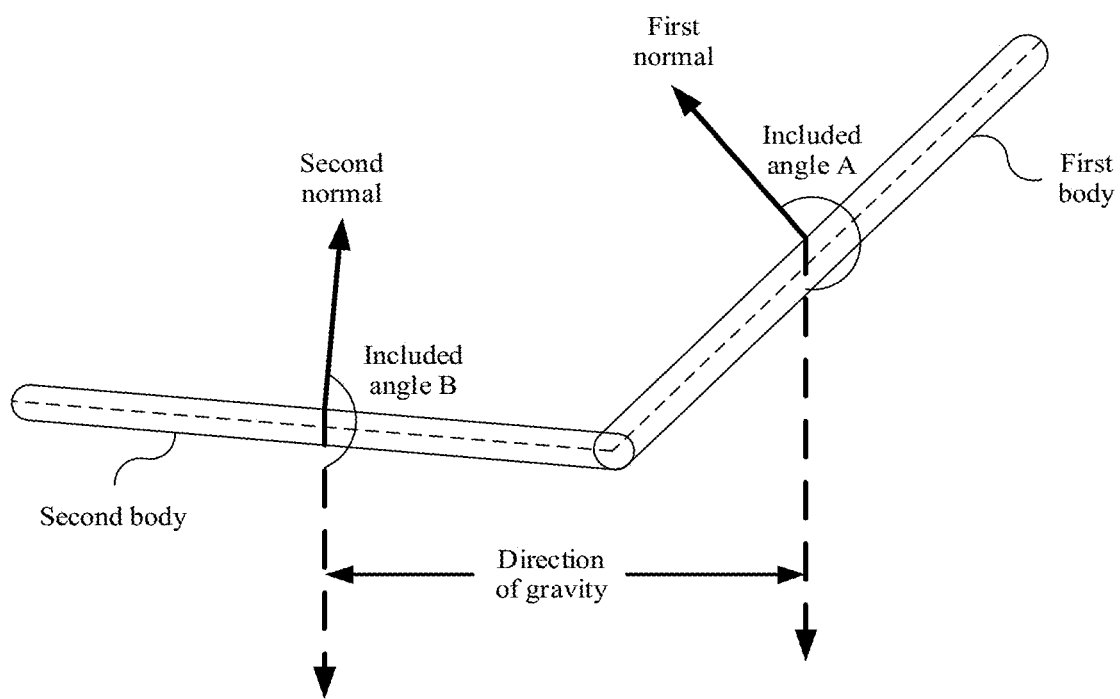
FIG. 2D is a schematic diagram of an included angle A and an included angle B according to an embodiment of this application.

For example, the electronic device determines, based on a sensor, an included angle A obtained by rotating a first normal of the first body clockwise to a direction of gravity and an included angle B obtained by rotating a second normal of the second body clockwise to the direction of gravity. For the included angle A and the included angle B, refer to FIG. 2D. The first normal is a line perpendicular to a plane on which the first body is located, and a direction of the first normal is pointing from a surface of the display of the electronic device to the outside of the electronic device. The second normal is a line perpendicular to a plane on which the second body is located, and a direction of the second normal is pointing from a surface of the display of the electronic device to the outside of the electronic device. Then, the electronic device determines the first screen and the second screen based on the posture of the first body and the second body. Specifically, if the included angle A is greater than the included angle B, the electronic device determines that the first display area on the first body is the first screen, and the second display area on the second body is the second screen. Conversely, if the included angle A is less than the included angle B, the electronic device determines that the first display area on the first body is the second screen, and the second display area on the second body is the first screen. That is, an included angle obtained by rotating a normal of a body on which the first screen is located clockwise to the direction of gravity is greater than an included angle obtained by rotating a normal of a body on which the second screen is located clockwise to the direction of gravity. It should be noted that, not limited to the foregoing method, the first screen and the second screen may be determined in another manner.

Using the electronic device shown in FIG. 2C as an example, as the electronic device flips up and down, the first screen may be switched from being displayed on the first body to being displayed on the second body.

When the electronic device is in the unfolded state, the display 194 may display content in full screen. In a possible implementation, when interface content is displayed in full screen, the interface content may occupy a part of the display area of the display 194. For example, when the display 194 is an abnormally cut screen (Notch screen), the interface content is displayed in a middle part of the abnormally cut screen. When a black screen occurs on a side edge or edges of two sides, it may also be considered that the electronic device displays the interface content in full screen. Alternatively, full-screen display may refer to displaying the interface content in a display area except a status bar. The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU may implement applications such as intelligent cognition of the electronic device 100, for example, image recognition, facial recognition, speech recognition, text comprehension, and the like.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer executable program code, and the executable program code includes instructions. The processor 110 performs various functional applications and data processing of the electronic device 100 by running the instructions stored in the internal memory 121. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device 100 is configured to answer a call or listen to voice information, the receiver 170B may be placed close to a human ear to listen to a voice.

The microphone 170C, also referred to as a "mike" or a "microphone", is configured to convert a sound signal into an electrical signal. When making a call or sending voice information, the user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function, in addition to collecting an audio signal. In some other embodiments, three, four, or more microphones 170C may be alternatively disposed in the electronic device 100, to collect an audio signal and reduce noise. The microphones may further identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure strength based on a change of the capacitance. When a touch operation acts on the display 194, the electronic device 100 detects strength of the touch operation by using the pressure sensor 180A. The electronic device 100 may also calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an SMS message application icon, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, thereby implementing the image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell leather case by using the magnetic sensor 180D. In some embodiments, when the electronic device 100 is a clamshell phone, the electronic device 100 may detect opening/closing of a clamshell by using the magnetic sensor 180D. Further, a feature such as automatic unlocking upon opening of the flip cover is set based on a detected opening or closing state of the leather case or a detected opening or closing state of the flip cover.

The acceleration sensor 180E may detect a magnitude of an acceleration of the electronic device 100 in each direction (usually, three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100; or when detecting insufficient reflected light, the electronic device 100 may determine that there is no object near the electronic device 100. The electronic device 100 may detect, by using the optical proximity sensor 180G, that a user holds the electronic device 100 close to an ear for a call, to automatically turn off a screen to save power. The optical proximity sensor 180G may also be used in a leather case mode or a pocket mode to automatically unlock or lock the screen.

The ambient light sensor 180L is configured to sense ambient light brightness. The electronic device 100 may adaptively adjust luminance of the display 194 based on the sensed luminance of the ambient light. The ambient light sensor 180L may also be configured to automatically adjust a white balance during photographing. The ambient light sensor 180L may further cooperate with the optical proximity sensor 180G to detect whether the electronic device 100 is in a pocket, to prevent a false touch.

The fingerprint sensor 180H is configured to collect a fingerprint. The electronic device 100 may use a feature of the collected fingerprint to implement fingerprint-based unlocking, unlocking for application access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when temperature reported by the temperature sensor 180J exceeds a threshold, the electronic device 100 degrades performance of a processor near the temperature sensor 180J, to reduce power consumption and implement thermal protection. In some other embodiments, when temperature is lower than another threshold, the electronic device 100 heats up the battery 142, to avoid abnormal shutdown of the electronic device 100 due to low temperature. In some other embodiments, when temperature is lower than still another threshold, the electronic device 100 boosts an output voltage of the battery 142 to avoid abnormal shutdown due to low temperature.

The touch sensor 180K may also be referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may be alternatively disposed on a surface of the electronic device 100, and is at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive key input, and generate a key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a micro-kernel architecture, a micro service architecture, or a cloud architecture. In an embodiment of this application, an Android system with a layered architecture is used as an example to describe a software structure of the electronic device 100.

Figure 1B:
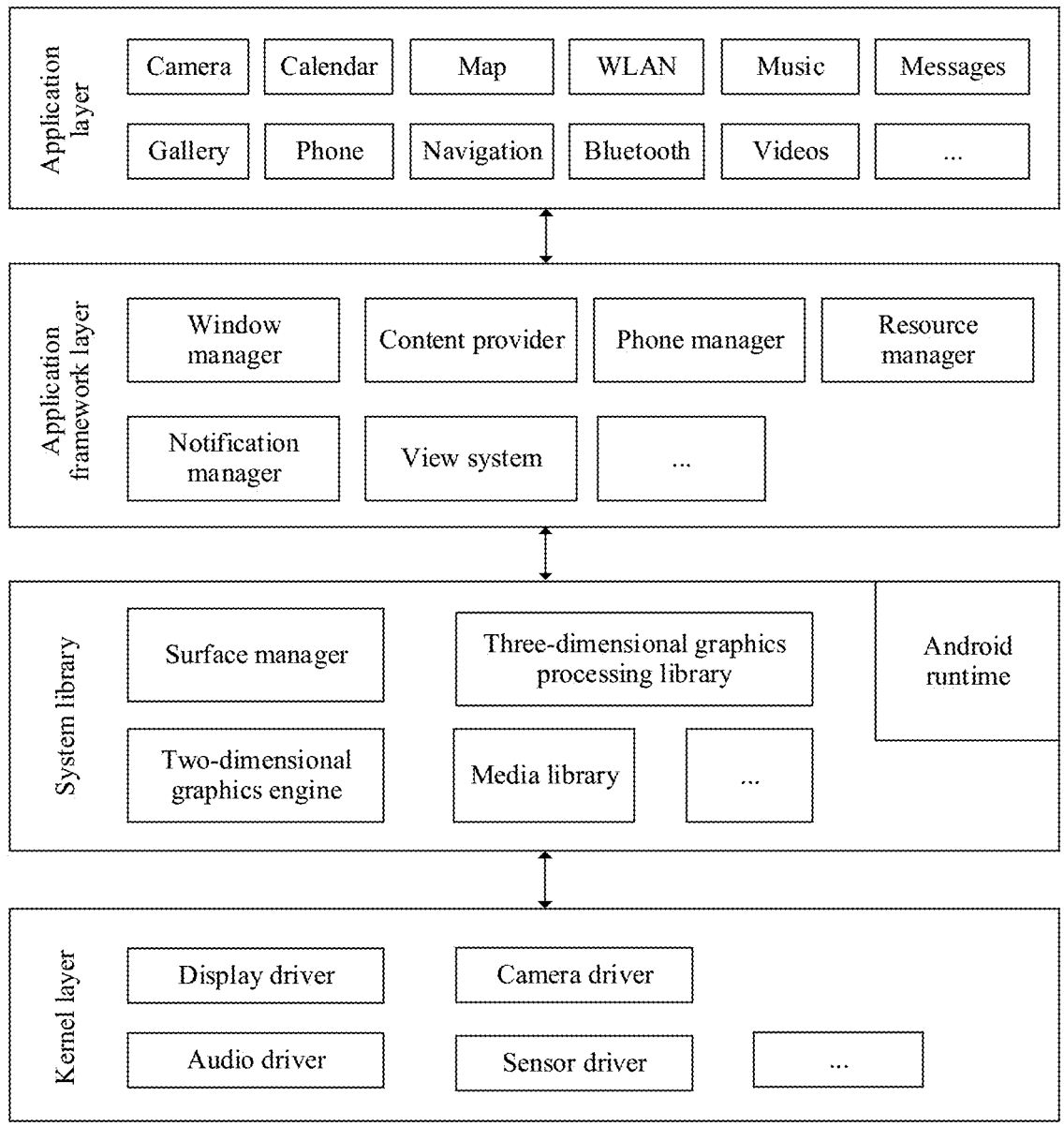
FIG. 1B is a block diagram of a software structure of an electronic device according to an embodiment of this application.

FIG. 1B is a block diagram of a software structure of an electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 1B, the application package may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 1B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including a message notification icon may include a text display view and a picture display view.

The phone manager is configured to provide a communication function of the electronic device 100, for example, management of a call status (including answering, declining, or the like).

The resource manager provides various resources for an application, such as a localized character string, an icon, an image, a layout file, and a video file.

The notification manager enables the application to display notification information in the status bar, and may be configured to convey a notification message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running in the background, or a notification that appears on the screen in a form of a dialog window. For example, text information is displayed on the status bar, an alert tone is played, a smart terminal vibrates, and the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run in the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video coding formats, such as MPEG-4, G.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 1B relates to an application presentation (such as a gallery or a file manager) that uses a sharing capability, a moment share module that provides the sharing capability, a print service (print service) that provides a printing capability, and a print spooler (print spooler). In addition, the application framework layer provides a printing framework, a WLAN service, and a Bluetooth service, and the bottom kernel layer provides a WLAN Bluetooth capability and a basic communications protocol.

The following describes working procedures of software and hardware of the electronic device 100 by using an example with reference to a photographing capture scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch operation and a control corresponding to the touch operation is a control of a camera application icon is used. A camera application invokes an interface of the application framework layer, so that the camera application is started. Then, a camera driver is started by invoking the kernel layer, and a static image or a video is captured by using the camera 193.

A video call display method provided in an embodiment of this application is described in detail below based on the electronic device 100 described in the foregoing content with reference to other accompanying drawings.

In this embodiment of this application, before a user receives a video call, the display 194 of the electronic device is displaying a first interface. Specifically, the first interface may include a home screen, a leftmost screen, and an interface of a first application. The first application may be any one of a plurality of applications included in the electronic device. For example, the first application may be an instant messaging application such as QQ or WeChat, or may be a social platform application such as Weibo, Twitter, or Facebook, or may be a shopping application such as Taobao or Amazon, or may be a video playback application such as TikTok or YouTube, or the like. This is not limited in this embodiment of this application. It should be noted that the first interface is a user interface displayed on the electronic device except a lock screen.

Specifically, an incoming video call received by the electronic device may be a video request received by using a second application. The second application may be an application that can send/receive a video request, for example, QQ, WeChat, or Phone. The second application and the first application may be a same application, or may be different applications. This is not limited in this embodiment of this application.

In this embodiment of this application, after the user answers the video call, the electronic device displays a video call interface in full screen. The video call interface is an interface used to display a first image and/or a second image. The first image is an image of a first user using the electronic device, and the second image is an image of a second user (that is, a user who sends the video request) that is in the video call with the first user. In this case, if a first bending operation entered by the first user on the electronic device is received, the electronic device displays, on a second screen, the first interface displayed by the electronic device before answering the video call. Then, if a second bending operation entered by the first user is received, the electronic device displays the lock screen on a second screen, or switches the second screen to a screen-off state. An interval time between the first bending operation and the second bending operation is not less than a preset value, and the preset value may be a time value such as 30 seconds, 1 minute, or 2 minutes. In this manner, the user can conveniently open the first interface displayed by the electronic device before answering the video call (that is, the video call interface and the first interface are displayed in split screen). This improves operation experience of the user.

The following describes an example user interface on the electronic device 100 used to display the home screen.

Figure 2E:
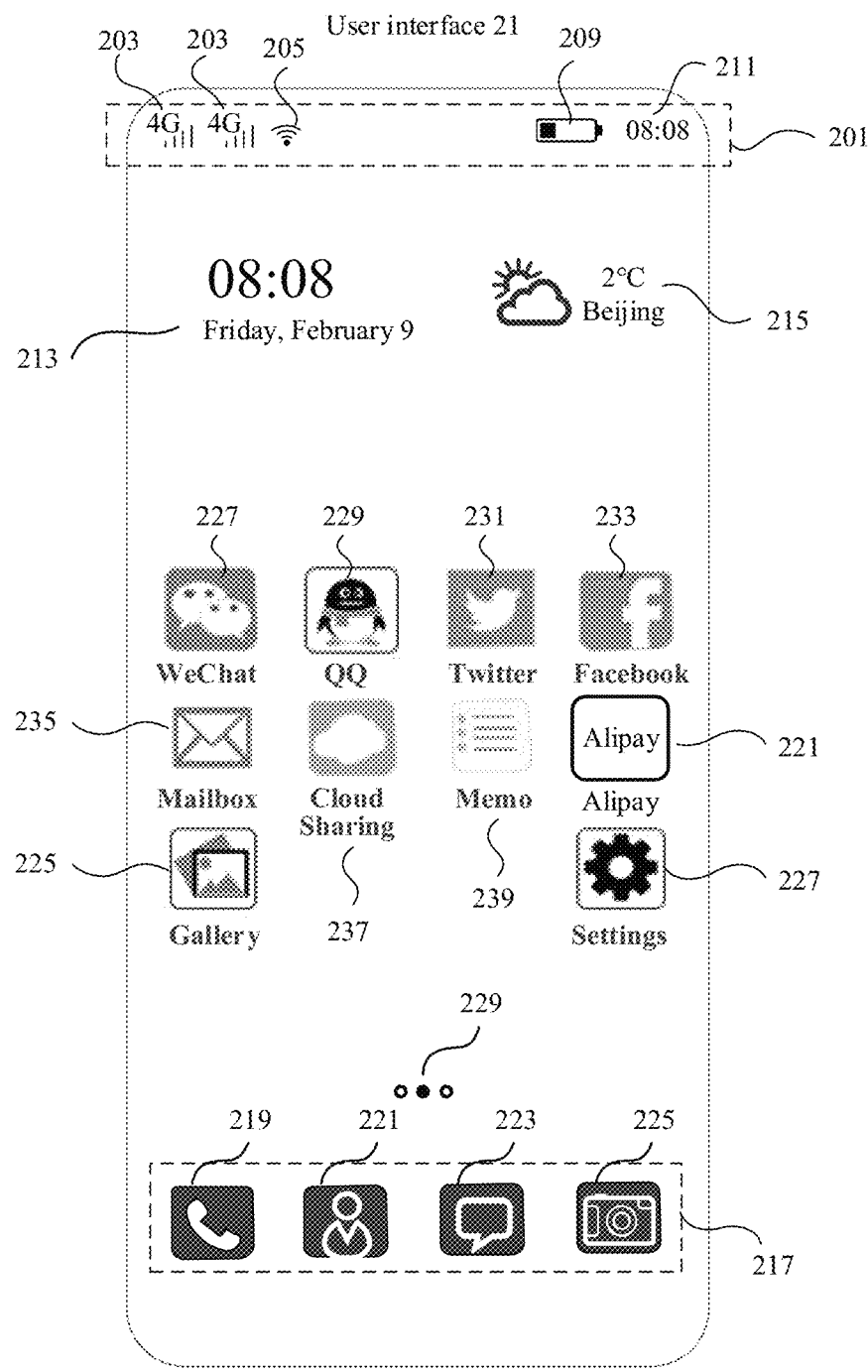
FIG. 2E is a schematic diagram of a user interface used to display a home screen according to an embodiment of this application.

FIG. 2E shows an example of a user interface 21 on the electronic device 100 used to display the home screen. As shown in FIG. 2E, the user interface 21 may include a status bar 201, a tray 217 with commonly used application icons, a calendar widget 213, a weather widget 215, and other application icons.

The status bar 201 may include one or more signal strength indicators 203 of a mobile communication signal (which may also be referred to as a cellular signal), one or more signal strength indicators 205 of a wireless fidelity (wireless fidelity, Wi-Fi) signal, a battery status indicator 209, and a time indicator 211.

The calendar widget 213 may be used to indicate a current time, for example, a date, a day of a week, and hour and minute information.

The weather widget 215 may be used to indicate a weather type, for example, cloudy to sunny, or light rain, and may be further used to indicate information such as a temperature.

The tray 217 with the commonly used application icons may display a Phone icon 219, a Contacts icon 221, a Messages icon 223, and a Camera icon 225.

For example, the other application icons may be a WeChat (WeChat) icon 227, a QQ icon 229, a Twitter (Twitter) icon 231, a Facebook (Facebook) icon 233, a Mailbox icon 235, a Cloud sharing icon 237, a Memo icon 239, an Alipay icon 221, a Gallery icon 225, and a Settings icon 227. The user interface 21 may further include a page indicator 229. The other application icons may be distributed on another page. The page indicator 229 may be used to indicate a quantity of pages and a specific page currently browsed by a user. For example, the page indicator 229 displays three small dots, the second small dot is black, and the other two small dots are white. This indicates that a mobile phone currently includes three pages and the user currently browses the second page. In addition, the user may swipe leftward or rightward on the current page to browse an application icon on another page. In some embodiments, the user interface 21 shown as an example in FIG. 2E may be a user interface on the home screen (Home screen).

In some other embodiments, the electronic device 100 may further include a home key. The home key may be a physical key or a virtual key. The home key may be configured to: receive an instruction of the user, and return from a currently displayed UI to the home screen in response to the instruction of the user. This can help the user view the home screen at any time. The instruction may be specifically an operation instruction of pressing the home key once by the user, may be an operation instruction of consecutively pressing the home key twice within a short time by the user, or may be an operation instruction of touching and holding the home key within a predetermined time by the user. In some other embodiments of this application, a fingerprint sensor may be further integrated in the home key, so that a fingerprint is collected and recognized when the home key is pressed.

It may be understood that FIG. 2E merely shows an example of a user interface on the electronic device 100, and should not constitute a limitation on this embodiment of this application.

Next, a user interface used to display the video call interface and the first interface in split screen in this embodiment of this application is further described.

In this embodiment of this application, when displaying the first interface, the electronic device may be in an unfolded state or may be in a folded state. The following describes an embodiment in which the video call interface and the first interface are displayed in split screen in the two states.

FIG. 3A to FIG. 3F are schematic diagrams of some embodiments in which an electronic device in an unfolded state receives an incoming video call, and displays a video call interface and a first interface in split screen according to an embodiment of this application.

Figure 3A:
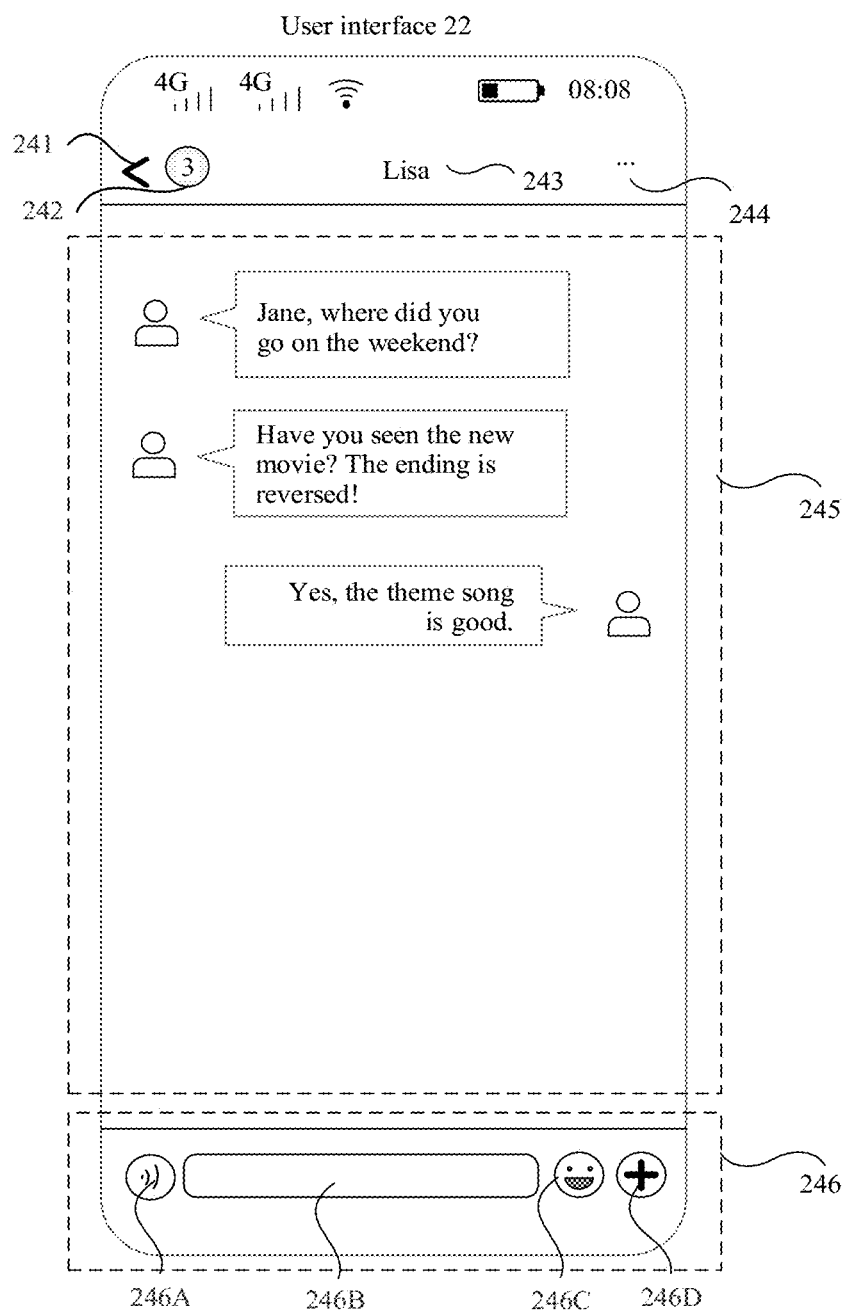
FIG. 3A to FIG. 3F are schematic diagrams of some embodiments in which an electronic device in an unfolded state receives an incoming video call, and displays a video call interface and a first interface in split screen according to an embodiment of this application.

As shown in FIG. 3A, the display 194 of the electronic device is in an unfolded state. In the unfolded state, the electronic device may display a user interface 22 in full screen on the display 194, and the user interface 22 is a WeChat (WeChat) chat interface.

The user interface 22 may include a back key 241, an indicator 242, indication information 243, a details control 244, a display area 245, and an input area 246.

The back key 241 may be used to return to an upper-level interface of the user interface 22. It should be noted that an upper-level interface of an application interface of an application is fixed, and is determined during application design.

The indicator 242 may be used to indicate an amount of unread information of a user in the WeChat application. In addition, when there is no unread information in the WeChat application, the indicator 242 may not be displayed in the user interface 22.

The indication information 243 may be used to indicate a name of a current chat object, and the name may be a name (or a remark) of a user or a WeChat group name. When the current chat object is a WeChat group, information about a quantity of people in the WeChat group may also be displayed.

The details control 244 may be used to receive an operation of the user, and in response to the operation of the user, the electronic device displays a plurality of pieces of detail information about a current chat. The detail information may be: search for chat content, mute notifications, top chat, strong reminder, and set a current chat background.

The display area 245 may be used to display chat content, and the chat content may include text/voice communication content between the user using the electronic device and a user of another social account. Optionally, the display area 245 may further display sending times of some chat content.

The input area 246 may be used to receive chat content entered by the user. Specifically, the input area 246 may include a voice input control 246A, an input box 246B, an emoticon input control 246C, and more input control 346D. The voice input control 246A is used to receive an operation of the user, and in response to the operation of the user, the electronic device displays a voice input button. Generally, the user may enter voice information by pressing and holding the voice input button. The input box 246B is used to receive an operation of the user, and in response to the operation of the user, the electronic device displays a keyboard/handwriting panel. Generally, the electronic device may receive, by using the keyboard/handwriting panel, text information entered by the user. The emoticon input control 246C is used to receive an operation of the user, and in response to the operation of the user, the electronic device displays a plurality of emoticon patterns/motion images for the user to select. The more input control 346D is configured to receive an operation of the user, and in response to the operation of the user, the electronic device displays a selection box of a plurality of input types, for example, album, camera, file, red packet, or video call, for the user to select.

It should be noted that the user interface 22 shows only one first interface as an example, and the first interface may alternatively be another user interface described in the foregoing content. This is not limited in this embodiment of this application.

Figure 3B:
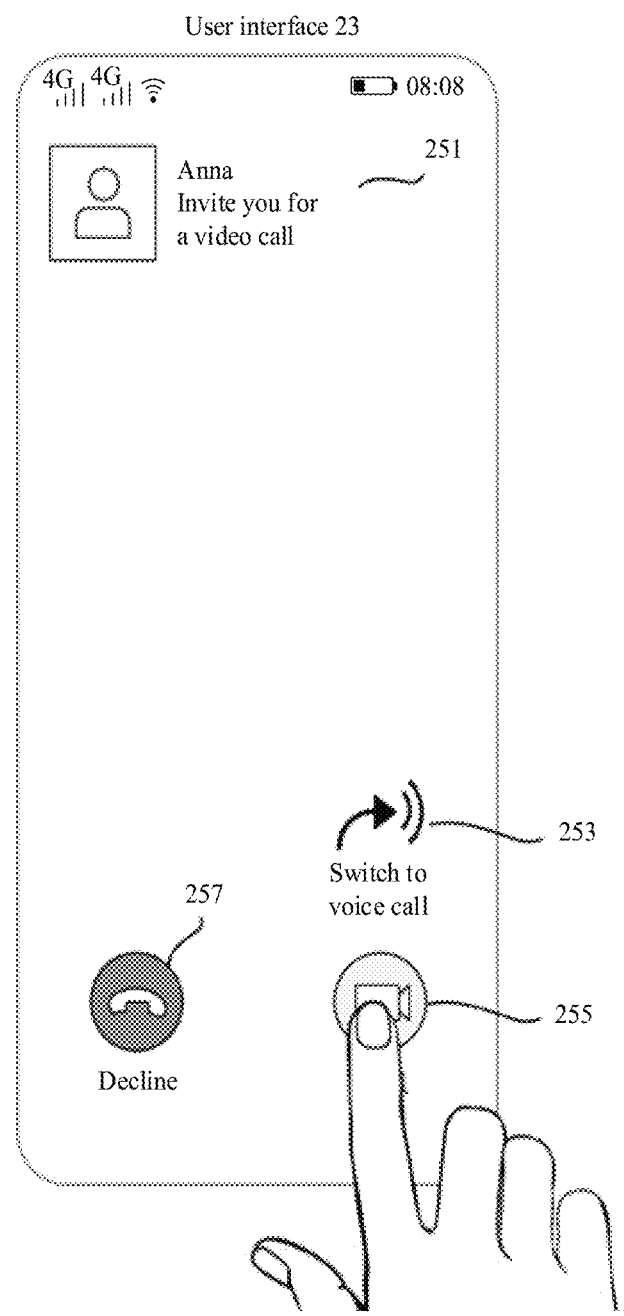

As shown in FIG. 3B, when the electronic device in the unfolded state is displaying the first interface (refer to FIG. 3A), if the electronic device receives an incoming video call from a second application, the electronic device may display an incoming video call notification interface (namely, a user interface 23) in full screen on the electronic device. The user interface 23 shows an example of the incoming video call notification interface from the WeChat application. That is, in this example, the first application and the second application are a same application. Optionally, when the user interface 23 is displayed, the electronic device may further play a prompt tone.

The user interface 23 may include indication information 251, an accept control 255, a decline control 257, and a switch control 253.

The indication information 251 may be used to indicate information about a second user who sends a video request. The information about the second user may include avatar information and nickname information (or remark information) of the user.

Figure 3C:
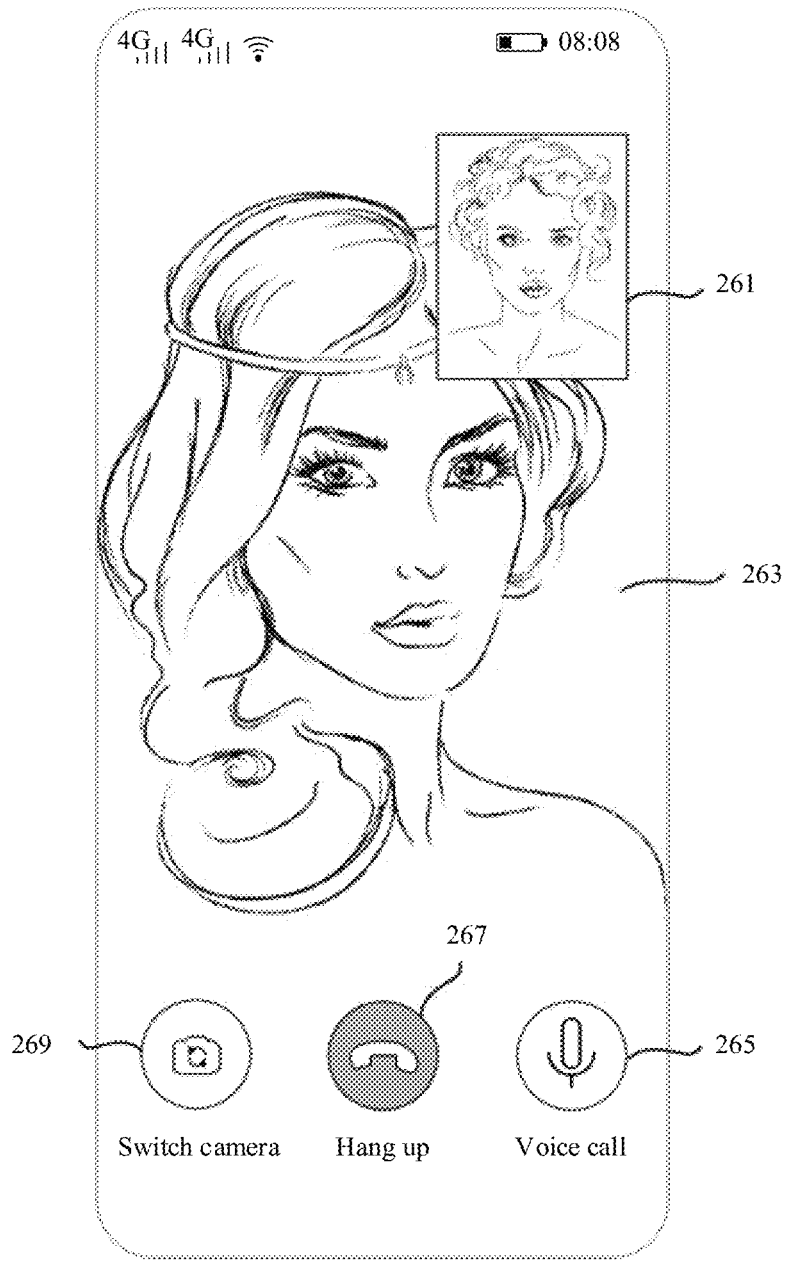

The accept control 255 may be used to establish a video call. The accept control 255 may receive a tap operation of the user, and in response to the operation of the user, the electronic device turns on the camera 193, the microphone 170C, and the speaker 170A, establishes a video call between a first user and the second user, and displays a video call interface. For the video call interface, refer to FIG. 3C. The first user is the user using the electronic device. FIG. 3C is further described later, and details are not described herein.

The decline control 257 may be used to decline the video request. The decline control 257 may receive a tap operation of the user, and in response to the operation of the user, the electronic device no longer displays the user interface 23, and declines the video request (the second user receives feedback information indicating that the video request is declined). Optionally, if the electronic device plays a prompt tone when the user interface 23 is displayed, in response to the operation performed on the decline control 257, the electronic device no longer plays the prompt tone.

The switch control 253 may be used to switch the video request to voice answering. The switch control 253 may receive a tap operation of the user, and in response to the operation of the user, the electronic device turns on the microphone 170C and the speaker 170A, establishes a voice call between the first user and the second user, and displays a voice call interface.

FIG. 3C is a schematic diagram of a user interface (namely, a user interface 24) used to display a video call interface according to an embodiment of this application. Specifically, in response to the operation of the user performed on the accept control 255, the electronic device displays the user interface 24. The user interface 24 may include a first image 261, a second image 263, a camera switching control 269, a hang-up control 267, and a voice switching control 265. The second image 263 may be an image of the second user initiating the video request. Optionally, the second image 263 may be displayed in full screen. The first image 261 may be a first image of the first user using the electronic device. The first image 261 is displayed over the second image 263 in a floating (superimposed) manner. The first image 261 may further receive a sliding operation of the user. In response to the sliding operation of the user, the electronic device moves a display position of the first image 261.

The camera switching control 269 may be used to switch a front-facing camera/rear-facing camera. Specifically, the first switching control 269 is used to receive an operation of the user. If the electronic device currently uses the front-facing camera, in response to the operation of the user, the electronic device disables the front-facing camera, enables the rear-facing camera, and switches from displaying the first image 261 to displaying an image captured by the rear-facing camera. If the electronic device currently uses the rear-facing camera, in response to the operation of the user, the electronic device disables the rear-facing camera, enables the front-facing camera, and switches from displaying the first image 261 to displaying an image captured by the front-facing camera.

The hang-up control 267 may be used to end the current video call. The hang-up control 267 may be used to receive an operation of the user, and in response to the operation of the user, the electronic device turns off the camera 193, the microphone 170C, and the speaker 170A, to end the video call between the first user and the second user.

The voice switching control 265 may be used to switch the current video call to a voice call. The switch control 265 may be used to receive an operation of the user, and in response to the operation of the user, the electronic device turns off the camera 193, no longer displays the second image and the first image, still keeps the microphone 170C and the speaker 170A on, and keeps the voice call between the second user and the first user.

Figure 3D:
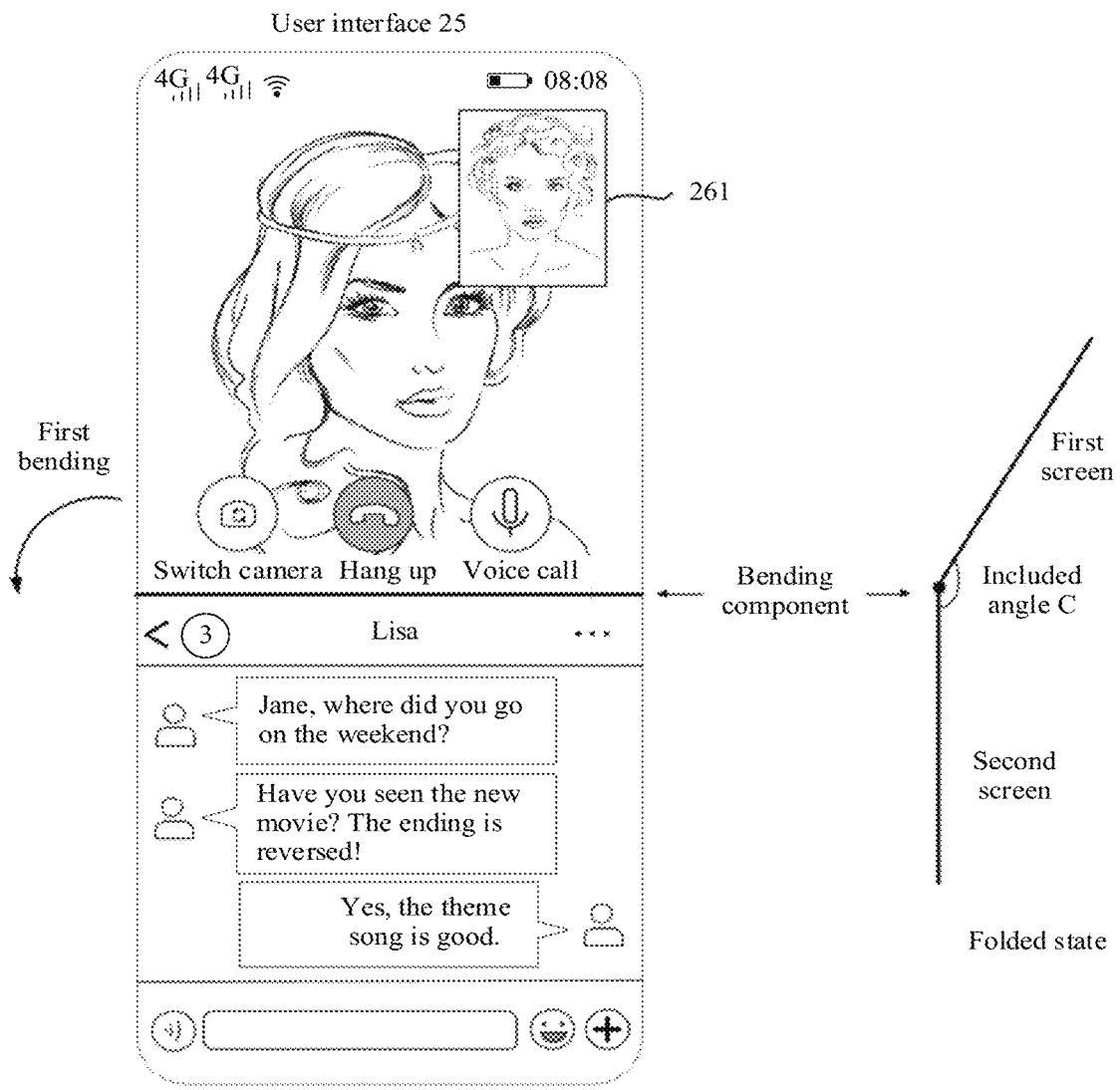

As shown in FIG. 3D, when the electronic device is in the unfolded state and the call interface is displayed (refer to FIG. 3C), if the electronic device receives a first bending operation entered by the user, in response to the first bending operation, the electronic device displays, on a second screen, the first interface displayed by the electronic device before answering the video call. It should be noted that the first bending operation may be one bending operation, or may be a plurality of bending operations. An interval time between two adjacent operations in the plurality of bending operations is less than a preset value, and the preset value may be a time value such as 30 seconds, 1 minute, or 2 minutes. For a manner in which the electronic device determines whether the electronic device is bent, refer to the manner described in the embodiment corresponding to FIG. 1A. Details are not described herein again.

A user interface 25 includes the video call interface and the first interface. The video call interface is displayed on a first screen, and the first interface is displayed on the second screen (refer to FIG. 3A).

Optionally, the video call interface displayed on the first screen may be a display result obtained after adjusting an interface scale of the video call interface (namely, the user interface 24) displayed in full screen by the electronic device in the unfolded state. The first interface displayed on the second screen may be a display result obtained after adjusting an interface scale of the first interface (namely, the user interface 22) displayed in full screen by the electronic device in the unfolded state. Optionally, the video call interface displayed on the first screen may be different from the video call interface displayed in full screen. For example, to better display the second image 263 of the second user, the first image 261 may not be displayed on the first screen.

In a possible implementation, the first interface displayed on the second screen may be different from the first interface displayed in full screen. For example, if the first interface displayed in full screen is a split-screen interface (for example, a split-screen interface that includes both a WeChat interface and a QQ interface), the first interface displayed on the second screen may be an interface (for example, the WeChat interface or the QQ interface) in the split-screen interface on which a user operation is detected most recently before an incoming call is answered.

In this manner, the video call interface and the first interface displayed by the electronic device before answering the video call can be conveniently displayed in split screen. This improves operation experience of the user.

Figure 3E:
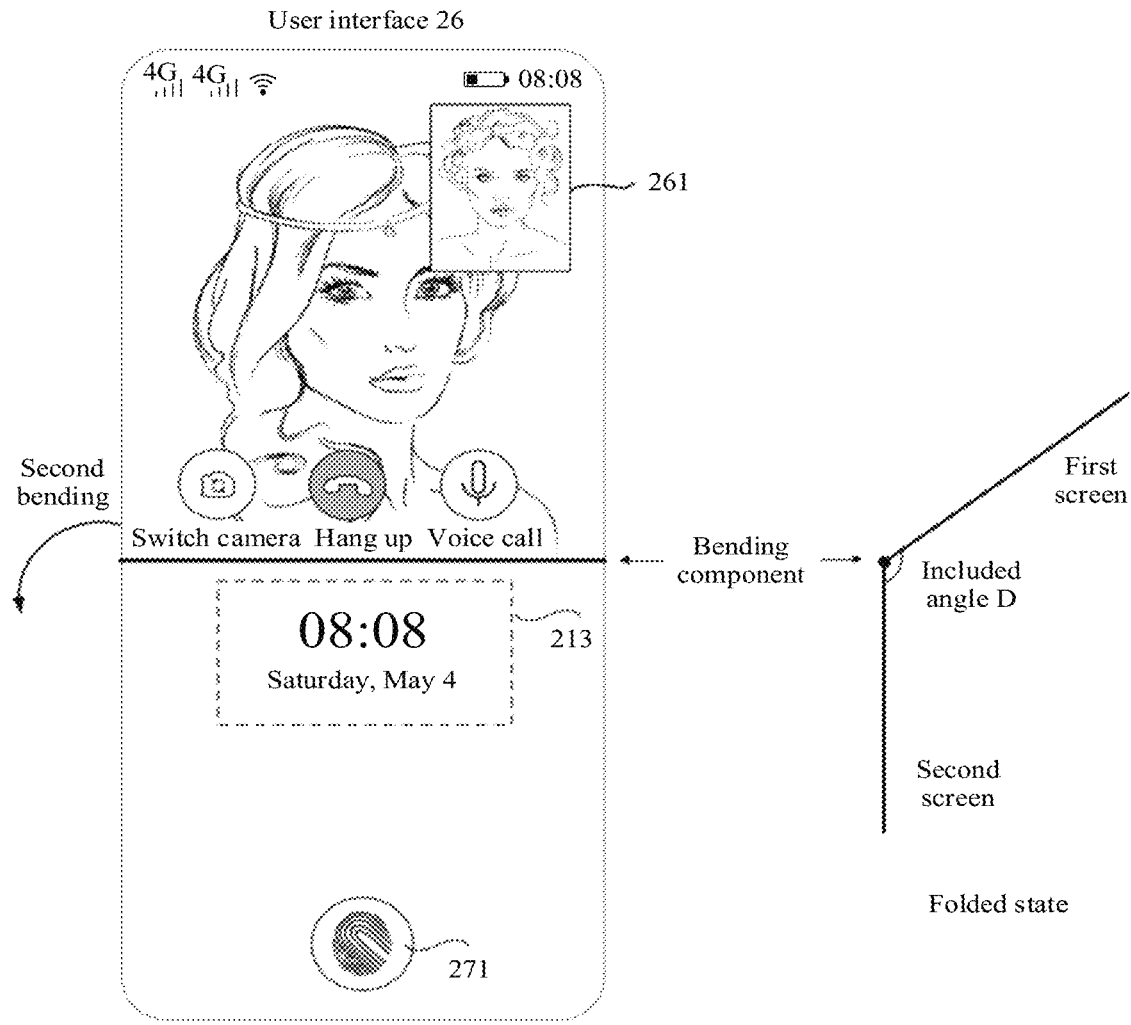

As shown in FIG. 3E, when the electronic device is in the folded state and the user interface 25 is displayed, if the electronic device receives a second bending operation entered by the user, in response to the second bending operation, the electronic device locks the second screen. That the electronic device locks the second screen means that a lock screen is displayed on the second screen, or the second screen enters a screen-off state (also known as a black screen state or a screen-off state). The lock screen is described in the following content, and is not described herein. The screen-off state means that a backlight board of the second screen is turned off, and no interface element is displayed on the second screen. In this manner, the second screen may be conveniently locked, and this prevents the user from accidentally touching a control on the second screen. In addition, when the second screen enters the screen-off state, power of the electronic device may be saved.

It should be noted that the second bending operation may be one bending operation, or may be a plurality of bending operations. An interval time between two adjacent operations in the plurality of bending operations is less than a preset value. An interval time between the first bending operation and the second bending operation is not less than the preset value.

A user interface 26 shows an example in which the lock screen is displayed in the second screen. The video call interface is displayed on the first screen of the electronic device, and the video call interface is the same as the video call interface displayed on the first screen on the user interface 25, and the lock screen is displayed on the second screen of the electronic device.

Specifically, the lock screen may include the calendar widget 213 and an unlock indicator 271.

The calendar widget 213 may be used to indicate a current time, for example, a date, a day of a week, and hour and minute information.

The unlock indicator 271 may be used to indicate an area for receiving fingerprint information of the user. A screen area in which the unlock indicator 271 is located may receive the fingerprint information of the user, and when the fingerprint information of the user matches prestored fingerprint information, the second screen is unlocked.

Figure 3F:
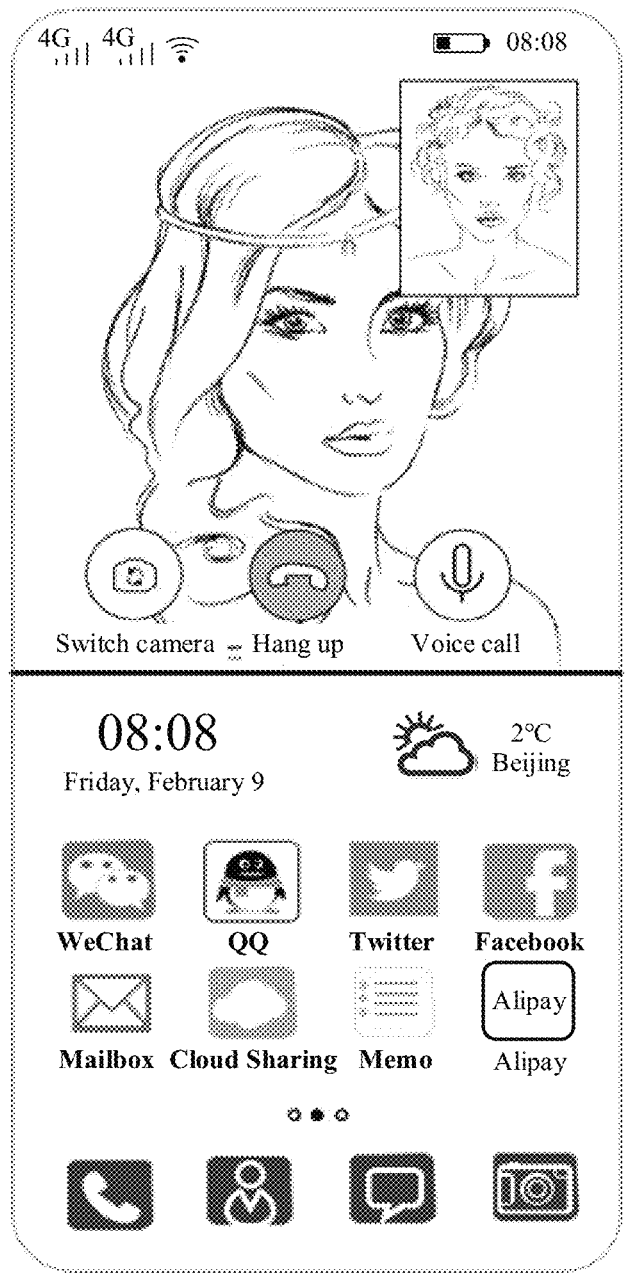

In a possible implementation, after the electronic device unlocks the second screen, the electronic device may display a home screen on the second screen. For elements included in the home screen, refer to the descriptions in the embodiment corresponding to FIG. 2E. For a schematic diagram of this display manner, refer to FIG. 3F. FIG. 3F shows an example of a user interface 27 for displaying the video call interface. In still another possible implementation, after the electronic device unlocks the second screen, the electronic device may display the first interface on the second screen. For this display manner, refer to the user interface 25. Optionally, the user may preset content (the home screen or the first interface) displayed on the unlocked second screen. The electronic device displays, on the second screen according to a setting of the user, a user interface corresponding to the setting.

In still another possible implementation, both the first bending operation and the second bending operation are inward folding operations, and the inward folding operation is a bending operation in which the first screen moves toward the second screen. Correspondingly, an outward folding operation is a bending operation in which the first screen moves against the second screen. In this manner, after the electronic device receives the first bending operation and displays the user interface 25, if an outward folding operation of the user performed on the electronic device is received, the electronic device does not lock the second screen. It should be noted that whether a bending operation is an inward folding operation or an outward folding operation may be determined based on a magnitude relationship between a first included angle between a body on which the first screen is located and a body on which the second screen is located when the bending operation starts and a second included angle between a body on which the first screen is located and a body on which the second screen is located when the bending operation ends. Specifically, if the first included angle is less than the second included angle, it is determined that the bending operation is an outward folding operation, or if the first included angle is greater than the second included angle, it is determined that the bending operation is an inward folding operation.

For example, refer to FIG. 3D and FIG. 3E. When the second bending operation starts, the first included angle between the body on which the first screen is located and the body on which the second screen is located is an included angle C, and when the second bending operation ends, the second included angle between the body on which the first screen is located and the body on which the second screen is located is an included angle D. The included angle C is greater than the included angle D, in this case, the second bending operation is an inward folding operation.

In still another possible implementation, after the electronic device receives the first bending operation and displays the user interface 25, if no user operation performed on the second screen is detected within a preset time period, the electronic device may lock the second screen. That is, the electronic device displays the lock screen on the second screen, or enables the second screen to enter the screen-off state. It should be noted that when the second screen enters the screen-off state, an operation of the user may be detected on the second screen, and in response to the operation of the user, the electronic device displays the lock screen on the second screen.

In addition, after the electronic device locks the second screen, display content of the first screen does not change, and on the first screen, an operation of the user may be detected, and an instruction corresponding to the user operation may be executed. For example, if an operation performed by the user on the camera switching control 269 is detected on the first screen, the electronic device switches the front-facing camera/rear-facing camera in response to the user operation. For a specific switching process, refer to the descriptions in the embodiment corresponding to FIG. 3C. Details are not described herein again.

FIG. 4A to FIG. 4E are schematic diagrams of some embodiments in which an electronic device in a folded state receives an incoming video call, and displays a video call interface and a first interface in split screen according to an embodiment of this application.

Figure 4A:
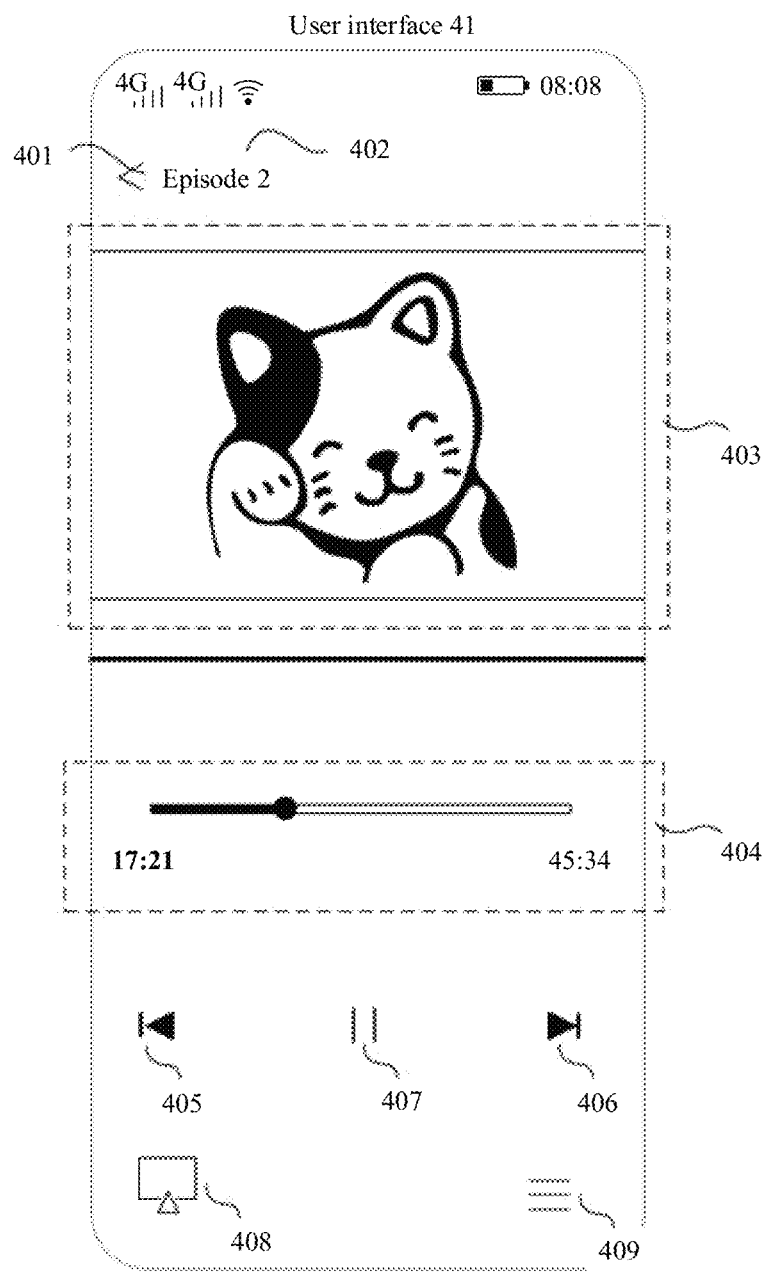
FIG. 4A to FIG. 4E are schematic diagrams of some embodiments in which an electronic device in a folded state receives an incoming video call, and displays a video call interface and a first interface in split screen according to an embodiment of this application.

As shown in FIG. 4A, the electronic device is in a folded state. In the folded state, the electronic device may display a user interface 41 in full screen on the display 194, and the user interface 41 is a video playback interface of a video playback application.

The user interface 41 may include: a back key 401, video content indication information 402, and a video image 403 that are displayed on a first screen, and playback progress indication information 404, an up-switching control 405, a down-switching control 406, a pause/play control 407, a projection control 408, and a menu control 409 that are displayed on a second screen.

The back key 401 may be used to return to an upper-level interface of the user interface 41. It should be noted that an upper-level interface of an application interface of an application is fixed, and is determined during application design.

The video content indication information 402 may be used to indicate related information of a currently played video. The related information may be information such as a name and an episode of the video.

The video image 403 may be a displayed image of the currently played video.

The playback progress indication information 404 may be used to indicate a playback progress of the current video. Specifically, the playback progress indication information 404 may include a progress bar, current playback moment information, and time information of a complete video.

The up-switching control 405 may be used to switch the current video to a previous video. Specifically, the previous video is a previous video that is close to the current video in a preset order in a folder in which the current video is located. For example, the previous video of an episode 2 video should be an episode 1 video.

The down-switching control 406 may be used to switch the current video to a next video. Specifically, the next video is a next video that is close to the current video in a preset order in the folder in which the current video is located. For example, the next video of the episode 2 video should be an episode 3 video.

The pause/play control 407 may be used to pause or play the current video. Specifically, the pause/play control 407 may be used to receive an operation of the user. If a current display status of the pause/play control 407 is a paused state (as shown in FIG. 4A), in response to the operation of the user, the electronic device pauses playing the current video, and switches the display status of the pause/play control 407 to a playing state. If the current display status of the pause/play control 407 is the playing state, in response to the operation of the user, the electronic device continues to play the current video, and switches the display status of the pause/play control 407 to the paused state.

The projection control 408 may be used to project the current video to another electronic device for playing. Specifically, the projection control 408 may be used to receive an operation of the user, and in response to the operation of the user, the electronic device displays a list of other electronic devices that can receive projection. In response to an operation of selecting, by the user, one another electronic device from the list, the electronic device sends information about the current video to the one another electronic device for display.

The menu control 409 may be used to receive an operation of the user, and in response to the operation of the user, the electronic device displays a control menu. The control menu may include a volume adjustment control, a brightness adjustment control, a barrage on/off control, a download control, a sharing control, and the like.

Figure 4B:
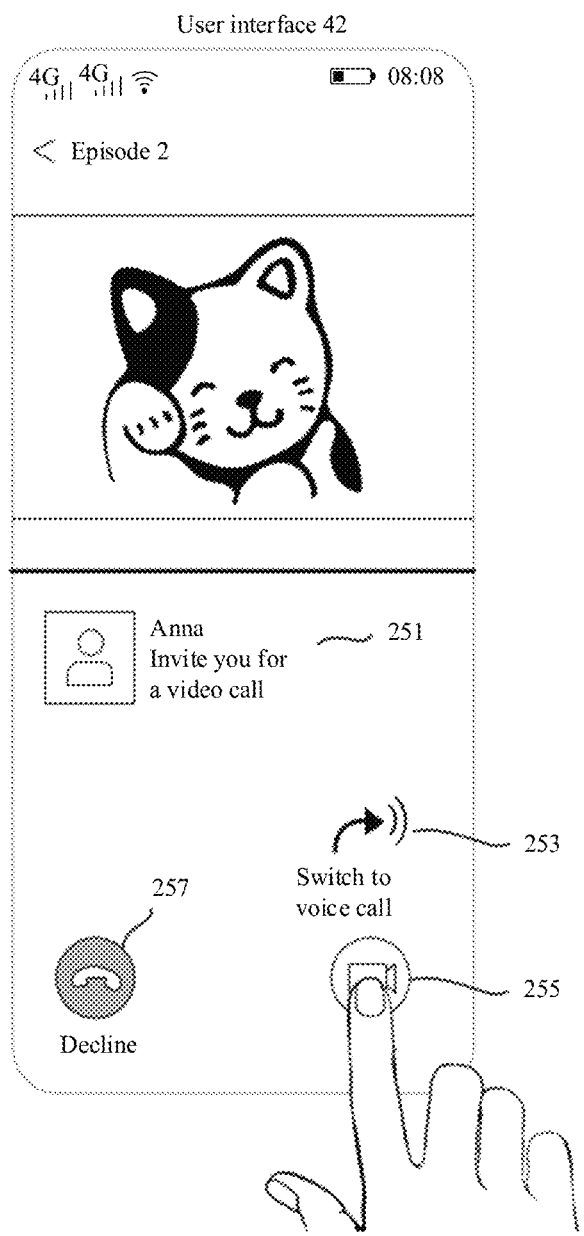

As shown in FIG. 4B, when the electronic device in the folded state is displaying the first interface (refer to FIG. 4A), if the electronic device receives an incoming video call from a second application, the electronic device may display an incoming video call notification interface on the second screen of the electronic device. The incoming video call notification interface is an incoming video call notification interface of a WeChat application. That is, in this example, a first application and the second application are different applications. Optionally, when the electronic device displays the incoming video call notification interface on the second screen, the electronic device may further play a prompt tone.

In a user interface 42, content displayed on the first screen is the same as content of the first interface displayed on the first screen before the video call is answered. The incoming video call notification interface is displayed on the second screen. For an interface element included in the incoming video call notification interface displayed on the second screen, refer to the descriptions in the embodiment corresponding to FIG. 3B. Details are not described herein again. In addition, the interface element included in the incoming video call notification interface displayed on the second screen may be the same as an interface element included in the incoming video call notification interface example shown in FIG. 3B, or the interface element included in the incoming video call notification interface displayed on the second screen may be different from an interface element included in the incoming video call notification interface example shown in FIG. 3B.

It should be noted that if an operation performed by the user on the accept control 255 is detected, the electronic device displays a user interface 43 in response to the operation of the user. If an operation performed by the user on the decline control 257 is detected, the electronic device displays the user interface 41 in response to the operation of the user, and declines the video request. If an operation performed by the user on the switch control 253 is detected, the electronic device switches the video request to voice answering, and displays a voice call interface.

In this manner, an incoming video call notification does not block the first interface displayed on the first screen, and in addition, the user may conveniently process the incoming video call notification on the second screen.

Figure 4C:
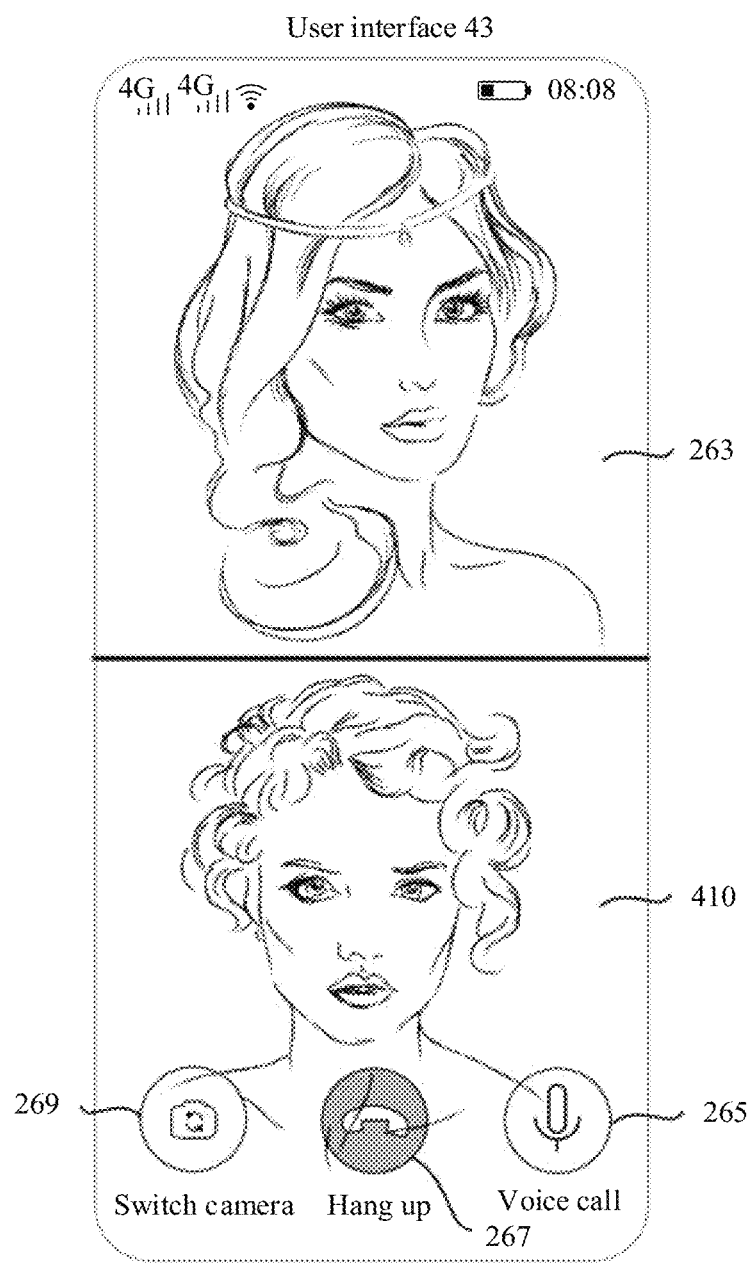

FIG. 4C is a schematic diagram of still another user interface (namely, the user interface 43) used to display a video call interface according to an embodiment of this application. In the user interface 43, the second image 263 of the second user is displayed on the first screen, and the first image 261 of the first user, the camera switching control 269, the hang-up control 267, and the voice switching control 265 are displayed on the second screen. For all these interface elements included in the user interface 43, refer to the descriptions in the embodiment corresponding to FIG. 3C.

In this manner, the user may view, on the first screen, the image of the second user that is in the call with the user, and view the image of the user on the second screen. Generally, compared with the second screen, the user can more easily view an interface of the first screen. In this display manner, the user can more easily view the image of the calling party.

Figure 4D:
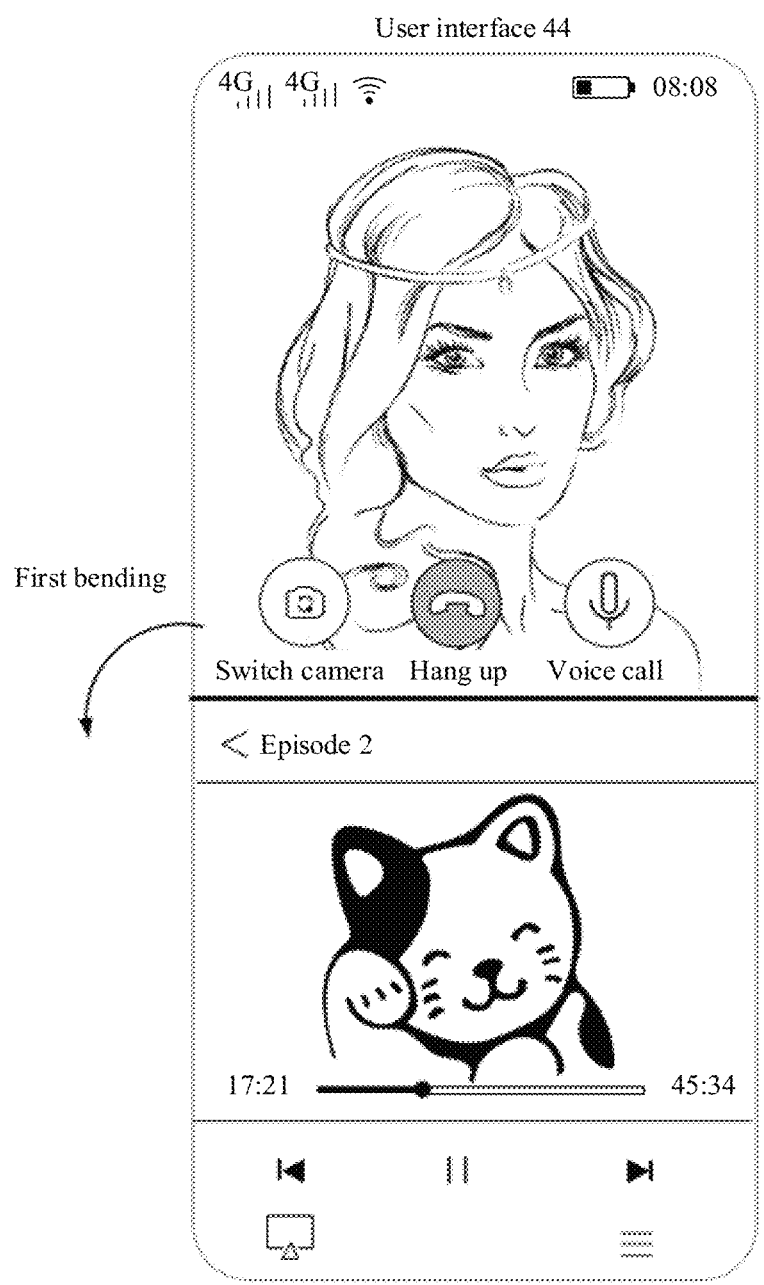

As shown in FIG. 4D, when the electronic device is in the folded state and the video call interface is displayed (refer to FIG. 4C), if the electronic device receives a first bending operation entered by the user, in response to the first bending operation, the electronic device displays a user interface 44.

In the user interface 44, the video call interface is displayed on the first screen, and the first interface (refer to FIG. 4A) displayed by the electronic device before answering the video call is displayed on the second screen.

Optionally, the video call interface displayed on the first screen may be a display result obtained after adjusting an interface scale of the video call interface (namely, the user interface 24) displayed in full screen by the electronic device when the electronic device is in the unfolded state. The first interface displayed on the second screen may be a display result obtained after adjusting an interface scale of the first interface (namely, the user interface 41) displayed in full screen by the electronic device in the unfolded state. Optionally, the call interface displayed on the first screen may be different from the call interface displayed in full screen. For example, to better display the second image 263 of the second user, the first image 261 may not be displayed on the first screen. Optionally, the first interface displayed on the second screen may be different from the first interface displayed in full screen. For example, to better display a video playing image, only the video image 403 may be displayed on the second screen. When the second screen receives a touch operation of the user, in response to the operation of the user, the back key 401, the video content indication information 402, the playback progress indication information 404, the up-switching control 405, the down-switching control 406, the pause/play control 407, the projection control 408, and the menu control 409 are displayed on the second screen.

In this manner, the video call interface and the first interface displayed by the electronic device before answering the video call can be conveniently displayed in split screen. This improves operation experience of the user.

Figure 4E:
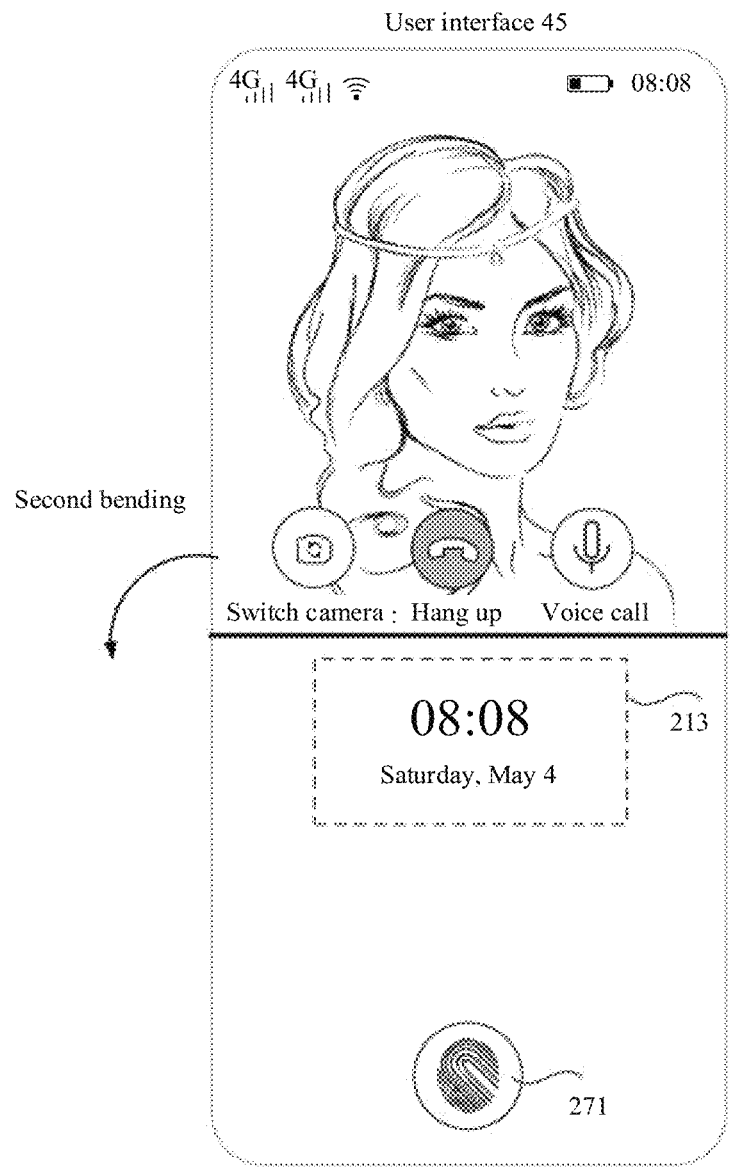

As shown in FIG. 4E, when the electronic device is in the folded state and the user interface 44 is displayed, if the electronic device receives a second bending operation entered by the user, in response to the second bending operation, the electronic device locks the second screen. That is, the electronic device displays a lock screen on the second screen, or enables the second screen to enter a screen-off state.

The user interface 44 shows an example in which the lock screen is displayed in the second screen. The call interface is displayed on the first screen of the electronic device, and the call interface is the same as the call interface displayed on the first screen on the user interface 44, and the lock screen is displayed on the second screen of the electronic device. For an interface element included in the lock screen, refer to the descriptions in FIG. 3E. Details are not described herein again.

In a possible implementation, after the electronic device unlocks the second screen, the electronic device may display a home screen on the second screen. For this display manner, refer to the user interface 27. In still another possible implementation, after the electronic device unlocks the second screen, the electronic device may display the first interface on the second screen. For this display manner, refer to the user interface 44. Optionally, the user may preset content displayed on the unlocked second screen. The electronic device displays, on the second screen according to a setting of the user, a user interface corresponding to the setting.

In still another possible implementation, after the electronic device receives the first bending operation and displays a user interface 45, if no user operation performed on the second screen is detected within a preset time period, the electronic device may lock the second screen. Optionally, after the electronic device receives the first bending operation and displays the user interface 45, if no user operation performed on the second screen is detected within a preset time period, and it is determined that the video image that is being played is not displayed on the second screen, the electronic device may lock the second screen. In other words, in this possible implementation, if the video image that is being played is displayed on the second screen, the electronic device does not lock the second screen.

The foregoing describes an embodiment in which the electronic device answers the video call from the second application while displaying the first interface. When the electronic device is in a locked screen/black screen state, and the video call from the second application is answered, the second screen of the electronic device may be locked in a manner of bending the electronic device. This embodiment is further described below.

In this embodiment of this application, when the electronic device is in the locked screen/black screen state, the electronic device may be in an unfolded state or may be in a folded state. The following describes an embodiment in which a video call interface is displayed in the two states.

FIG. 5A to FIG. 5E are schematic diagrams of some embodiments in which an electronic device in an unfolded state receives an incoming video call, and displays a video call interface according to an embodiment of this application.

Figure 5A:
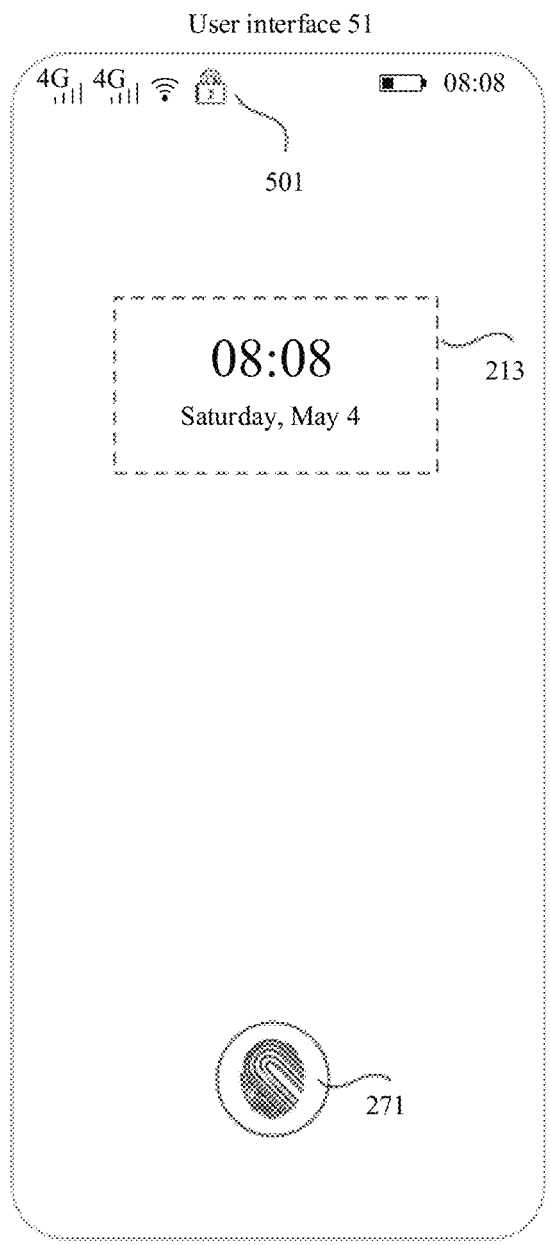
FIG. 5A to FIG. 5E are schematic diagrams of some embodiments in which an electronic device in an unfolded state receives an incoming video call, and displays a video call interface according to an embodiment of this application.

As shown in FIG. 5A, the electronic device is in an unfolded state. In the unfolded state, the electronic device displays a user interface 51 in full screen on the display 194, and the user interface 51 is a lock screen. It should be noted that, in this embodiment, the electronic device may also be in a screen-off state.

The lock screen shown for example in the user interface 51 may include the status bar 201, the calendar widget 213, and the unlock indicator 271.

The status bar 201 may include one or more signal strength indicators 203 of a mobile communication signal, one or more signal strength indicators 205 of a wireless fidelity signal, the battery status indicator 209, and the time indicator 211, and may further include a lock indicator 501. The lock indicator 501 is used to indicate that a screen of the electronic device is in a locked state.

For the calendar widget 213 and the unlock indicator 271, refer to the descriptions in the foregoing content. Details are not described herein again.

Figure 5B:
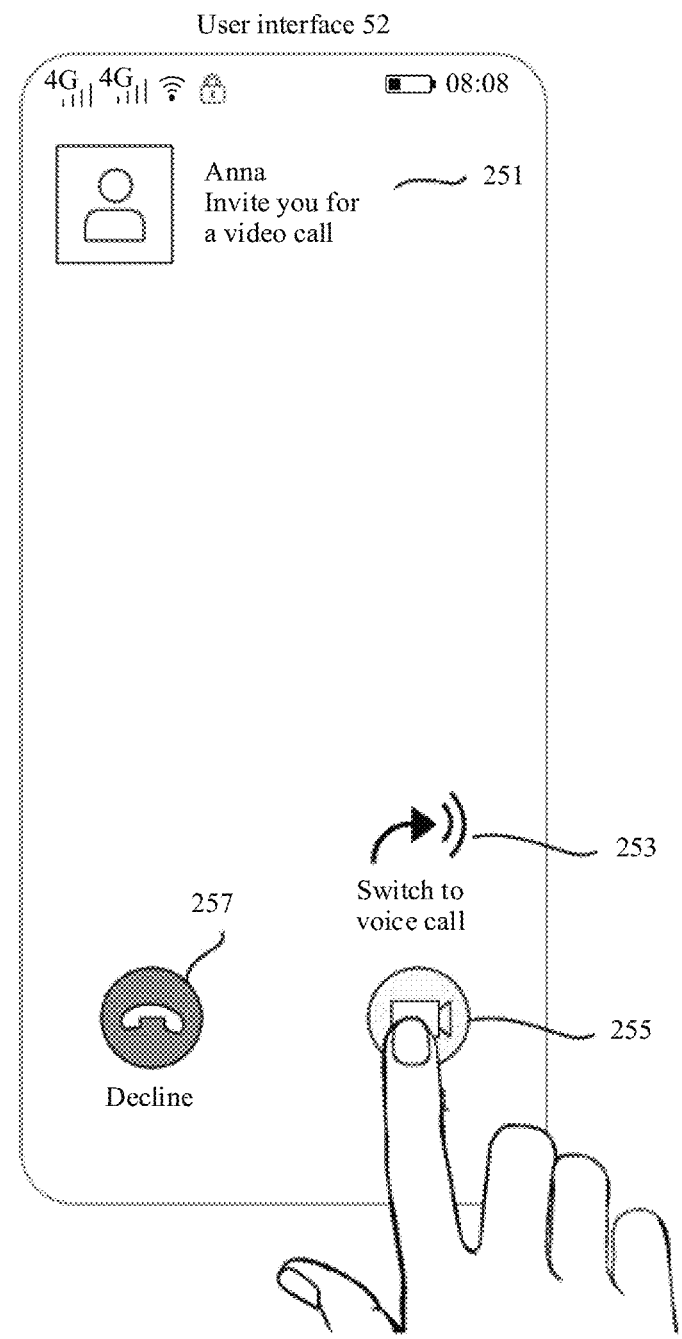

As shown in FIG. 5B, when the electronic device in the unfolded state is displaying the lock screen (refer to FIG. 5A), or in the screen-off state, if the electronic device receives an incoming video call from a second application, the electronic device may display an incoming video call notification interface (namely, a user interface 52) in full screen on the electronic device. Optionally, when the user interface 52 is displayed, the electronic device may further play a prompt tone.

The user interface 52 may include the indication information 251, the accept control 255, the decline control 257, and the switch control 253. For all of these controls, refer to the descriptions in the embodiment corresponding to FIG. 3B. Details are not described herein again.

Figure 5C:
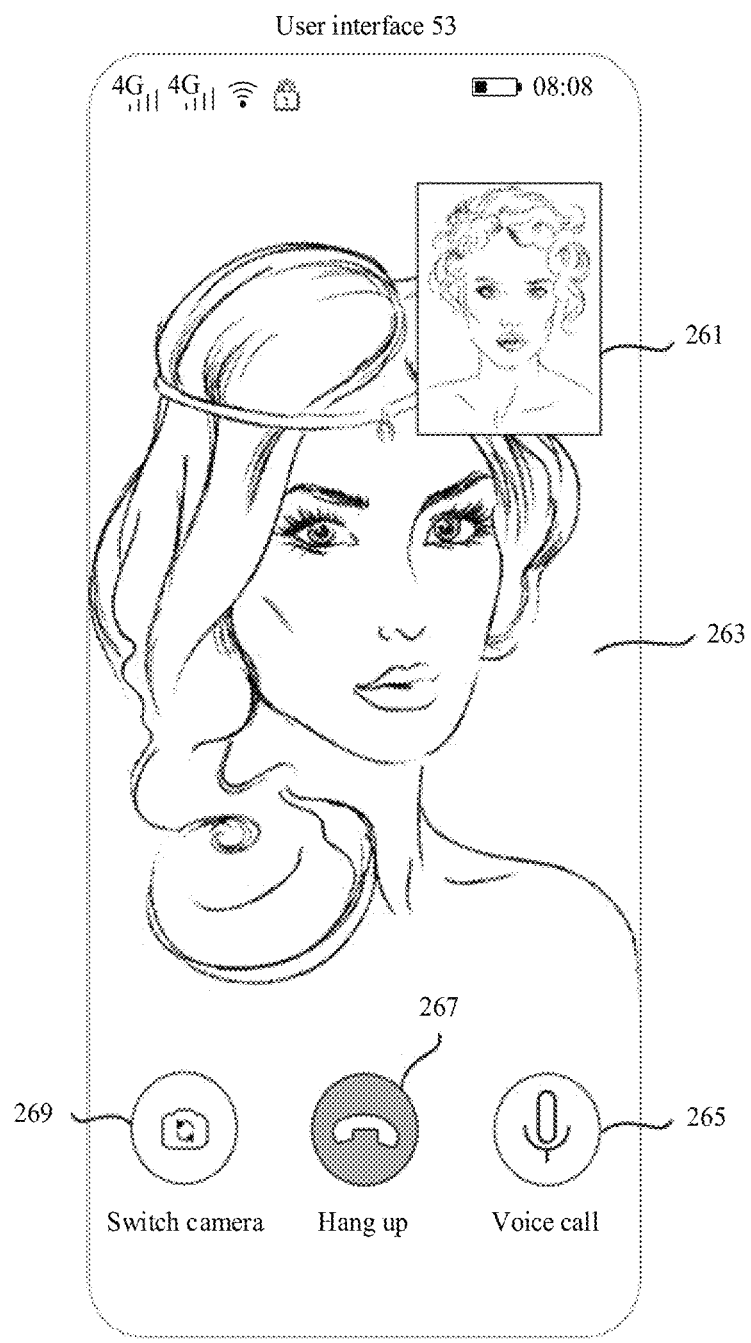

FIG. 5C is a schematic diagram of still another user interface (namely, the user interface 53) used to display a video call interface according to an embodiment of this application. Specifically, in response to the operation of the user performed on the accept control 255, the electronic device displays the user interface 53. The user interface 53 may include the second image 263, the first image 261, the camera switching control 269, the hang-up control 267, and the voice switching control 265. For all of these controls, refer to the descriptions in the embodiment corresponding to FIG. 3C. Details are not described herein again.

Figure 5D:
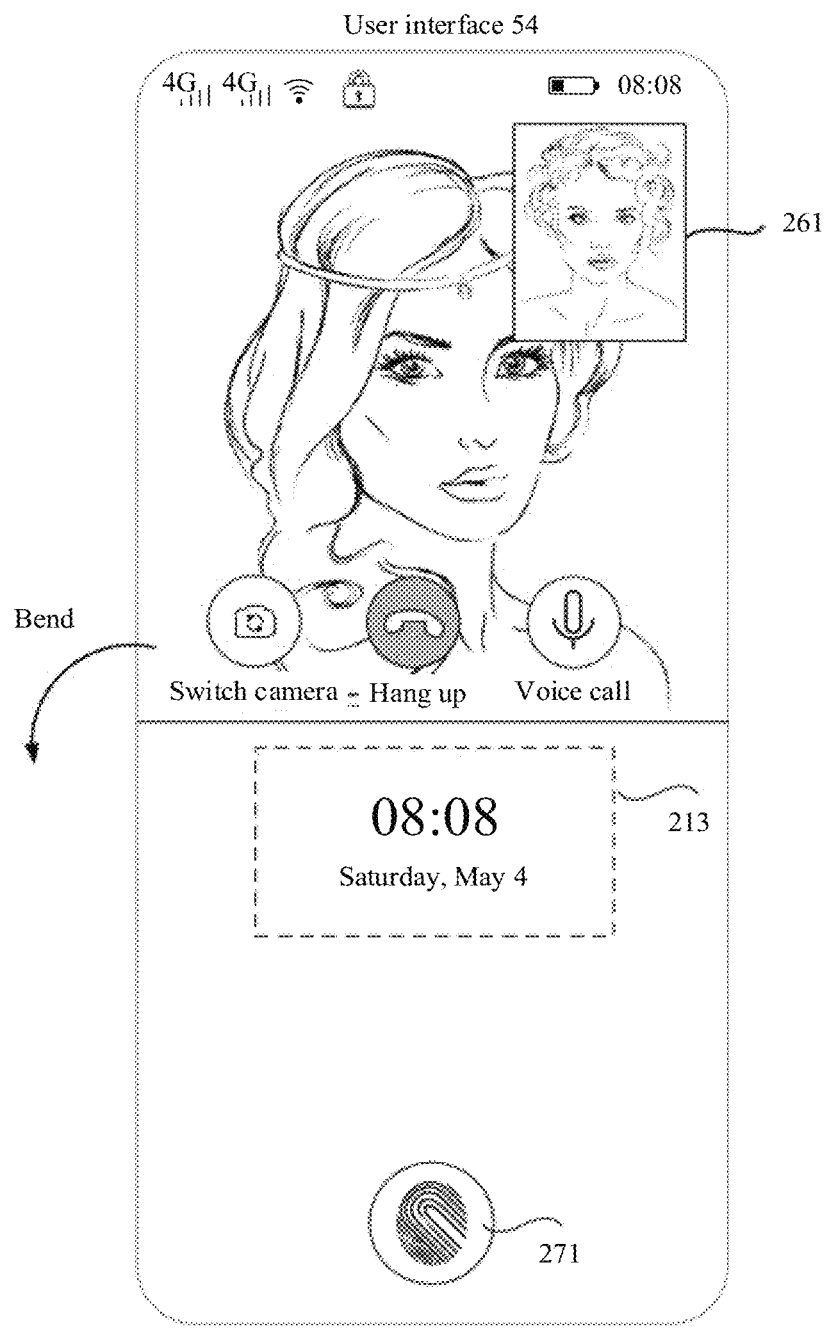

FIG. 5D is a schematic diagram of still another user interface (namely, the user interface 54) used to display a video call interface according to an embodiment of this application. Specifically, when the electronic device is in the unfolded state and the video call interface is displayed (refer to FIG. 5C), if the electronic device receives a bending operation entered by the user, in response to the bending operation of the user, the electronic device displays the lock screen on the second screen (or enables the second screen to enter the screen-off state). In this manner, it can be convenient for the user to lock the second screen, and this prevents the user from accidentally touching a control on the second screen. In addition, when the second screen enters the screen-off state, power of the electronic device may be saved.

In a possible implementation, after the electronic device unlocks the second screen, the electronic device may display a home screen on the second screen. For the manner of displaying the home screen on the second screen, refer to the descriptions in the embodiment corresponding to FIG. 3F.

Figure 5E:
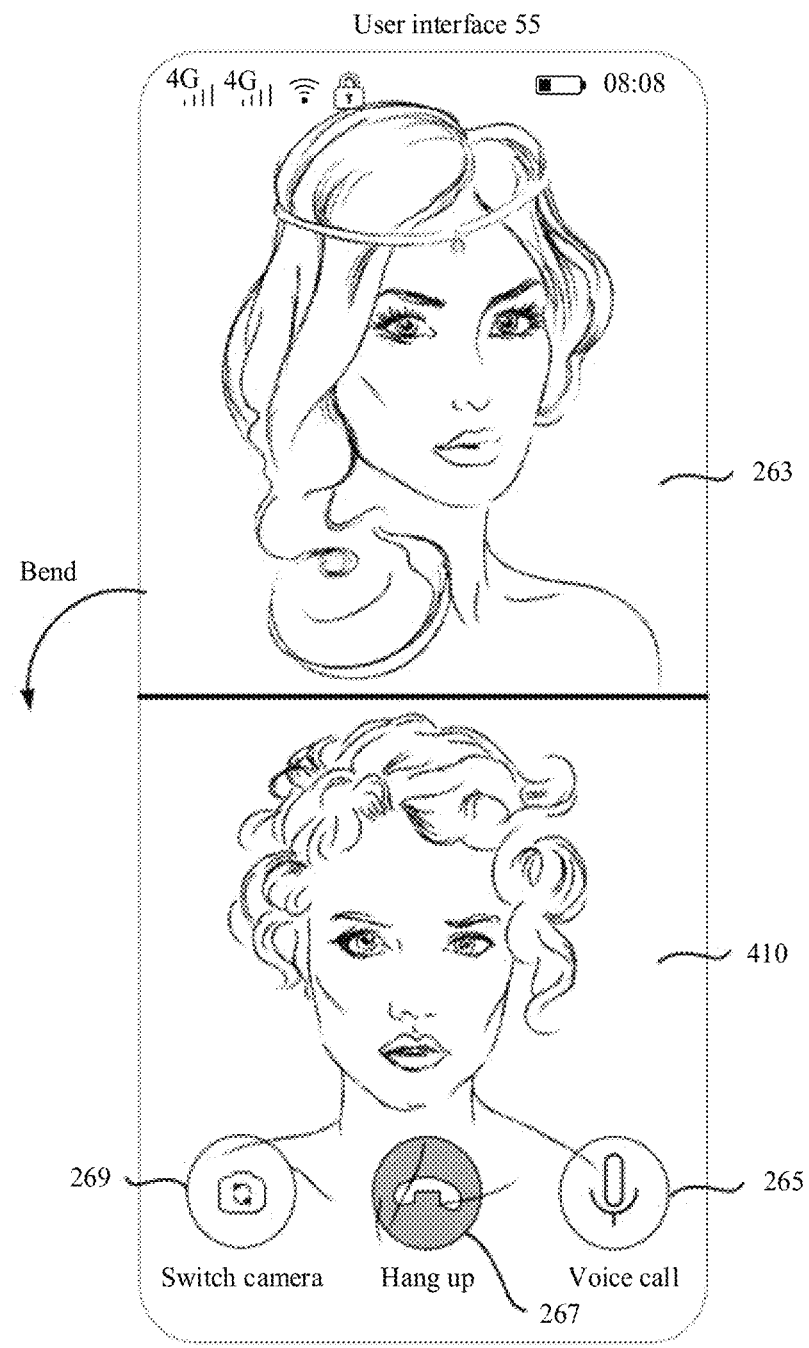

In still another possible implementation, as shown in FIG. 5E, when the electronic device is in the unfolded state and the call interface is displayed (refer to FIG. 5C), if the electronic device receives a first bending operation entered by the user, in response to the first bending operation, the electronic device displays a user interface 55. In the user interface 55, the second image 263 is displayed on the first screen of the electronic device, and the first image 261, the camera switching control 269, the hang-up control 267, and the voice switching control 265 are displayed on the second screen of the electronic device. For all of these controls, refer to the descriptions in the embodiment corresponding to FIG. 3C. Details are not described herein again. In this manner, the images of the two users may be conveniently displayed on the two screen interfaces respectively, to avoid that the first image blocks the second image.

Then, if the electronic device receives a second bending operation entered by the user, in response to the second bending operation, the electronic device locks the second screen (refer to the user interface 55). Optionally, in this implementation, both the first bending operation and the second bending operation may be inward folding operations.

Figure 6A:
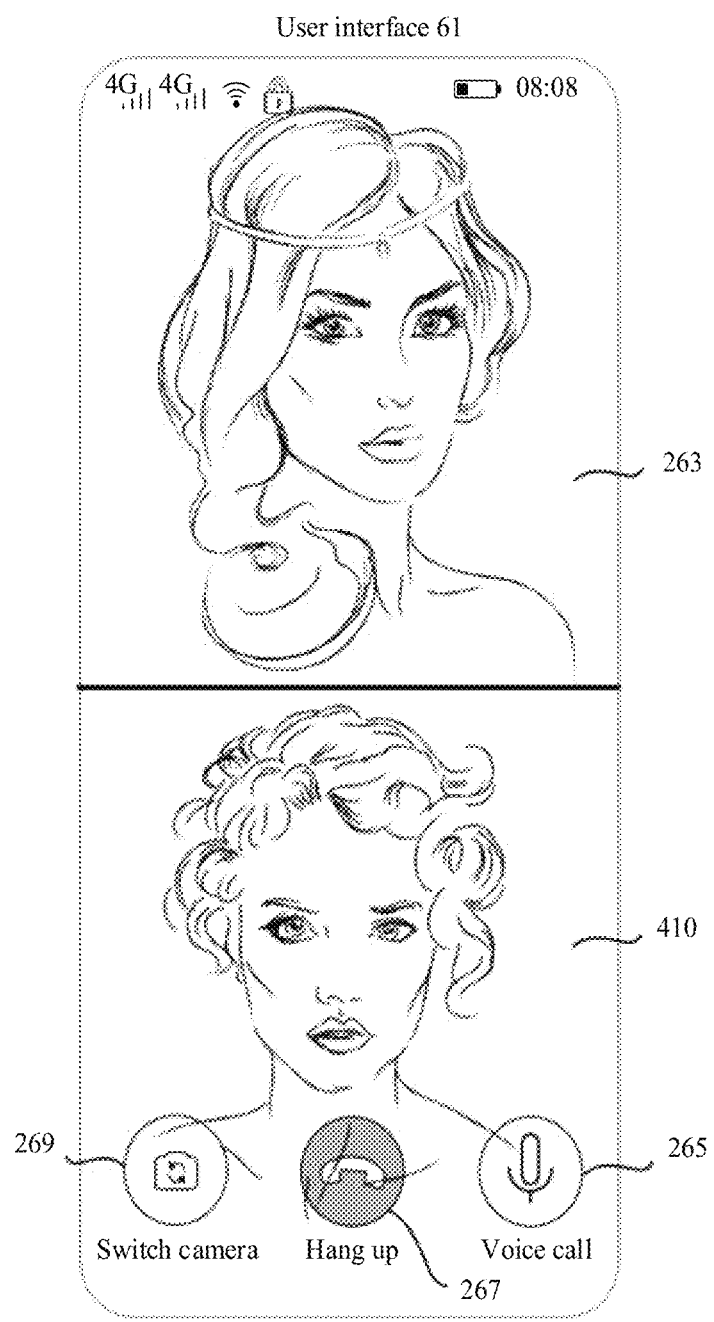
FIG. 6A and FIG. 6B are schematic diagrams of some embodiments in which an electronic device in a folded state receives an incoming video call, and displays a video call interface according to an embodiment of this application.
Figure 6B:
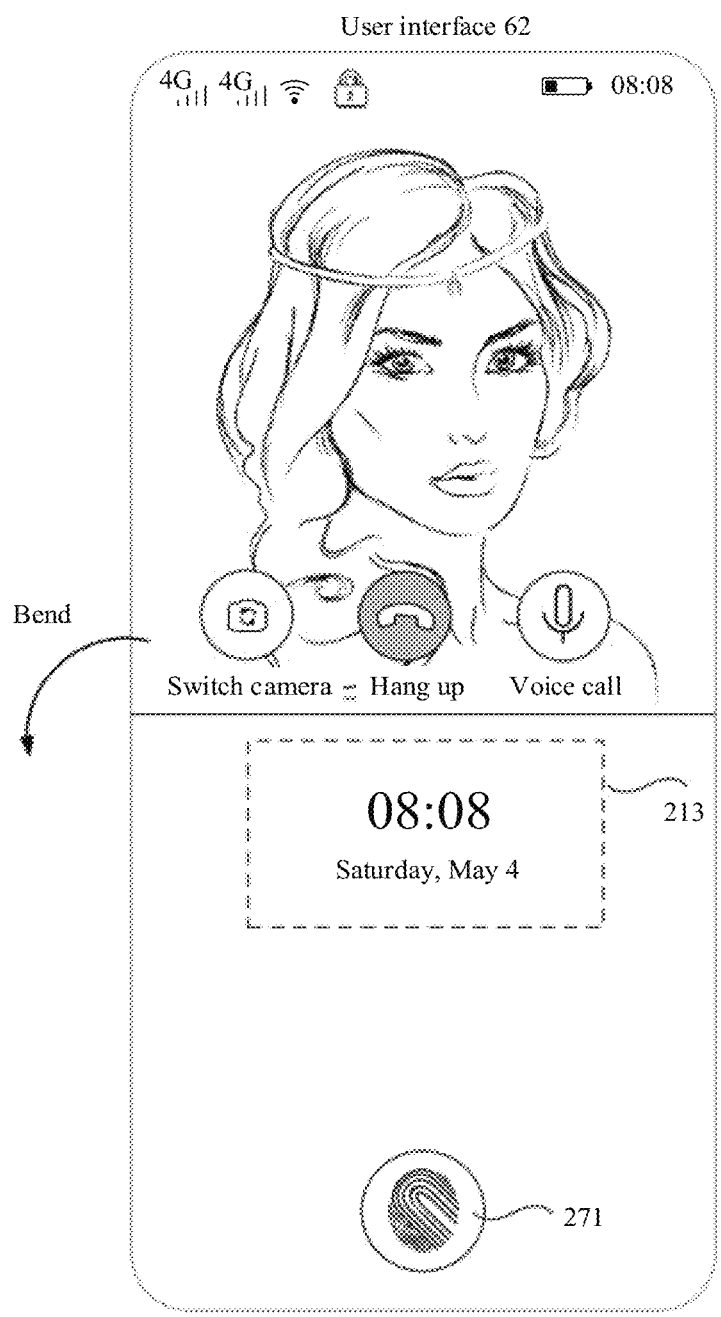

FIG. 6A and FIG. 6B are schematic diagrams of some embodiments in which an electronic device in a folded state receives an incoming video call, and displays a video call interface according to an embodiment of this application.

It should be noted that, for a lock screen displayed in full screen by the electronic device in the folded state, refer to an example shown in FIG. 5A. Similarly, when the electronic device in the folded state is displaying the lock screen, or in a screen-off state, the electronic device receives an incoming video call from a second application. For an incoming video call notification interface displayed by the electronic device in full screen, refer to an example shown in FIG. 5B. Details are not described herein again.

FIG. 6A is a schematic diagram of still another user interface (namely, a user interface 61) used to display a video call interface according to an embodiment of this application. Specifically, in response to the operation of the user performed on the accept control 255, the electronic device displays the user interface 61. In the user interface 61, the second image 263 is displayed on a first screen of the electronic device, and the first image 261, the camera switching control 269, the hang-up control 267, and the voice switching control 265 are displayed on a second screen of the electronic device. For all of these controls, refer to the descriptions in the embodiment corresponding to FIG. 3C. Details are not described herein again. In this display manner, the images of the two users may be respectively displayed on the two screen interfaces, to avoid that the first image blocks the second image.

As shown in FIG. 6B, when the electronic device is in the folded state and the video call interface is displayed (refer to FIG. 6A), if the electronic device receives a bending operation entered by the user, in response to the bending operation of the user, the electronic device displays the lock screen on the second screen (or enables the second screen to enter the screen-off state). In this manner, it can be convenient for the user to lock the second screen, and this prevents the user from accidentally touching a control on the second screen. In addition, when the second screen enters the screen-off state, power of the electronic device may be saved.

It should be noted that in the foregoing embodiments of this application, in a video call process, if the electronic device detects that the electronic device switches from the folded state to the unfolded state, and the electronic device is not locked, the electronic device switches from displaying a current user interface to displaying the user interface 24. For example, in the video call process, a user interface currently displayed by the electronic device is the user interface 25 (which may also be the user interface 26, the user interface 27, the user interface 34, the user interface 44, and the user interface 45). An unfolding operation entered by the user is detected. The unfolding operation enables the electronic device to switch from the folded state to the unfolded state, and the electronic device switches from displaying the user interface 25 to displaying the user interface 24 in response to the unfolding operation.

In addition, in the video call process, if the electronic device detects that the electronic device switches from the folded state to the unfolded state, and the electronic device is locked, the electronic device switches from displaying the current user interface to displaying the user interface 53. For example, in the video call process, the user interface currently displayed by the electronic device is the user interface 54 (which may also be the user interface 55, the user interface 61, and the user interface 62). An unfolding operation entered by the user is detected. The electronic device switches from displaying the user interface 54 to displaying the user interface 53 in response to the unfolding operation.

The foregoing describes some embodiments in which the electronic device receives the incoming video call, and displays the video call interface according to the embodiments of this application. The following further describes a video call display method provided in an embodiment of this application.

Figure 7:
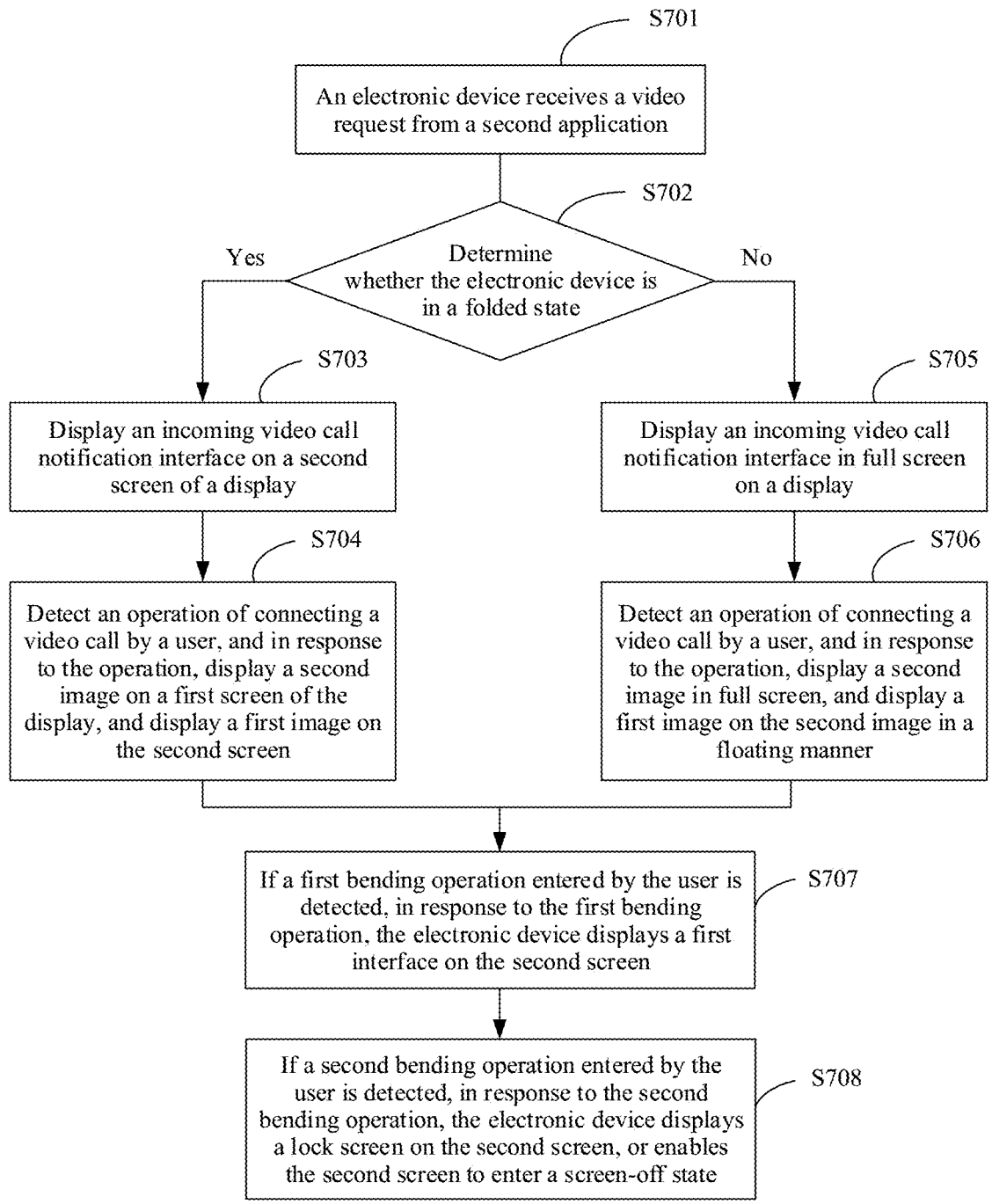
FIG. 7 is a flowchart of a video call display method applied to an electronic device according to an embodiment of this application.

FIG. 7 is a flowchart of a video call display method applied to an electronic device according to an embodiment of this application. This method is applicable to an application scenario in which the electronic device receives a video request from a second application when displaying a first interface. The method includes but is not limited to the following steps.

S701: The electronic device receives the video request from the second application.

S702: The electronic device determines whether the electronic device is in a folded state, and if yes, step S703 is performed. If no, step S705 is performed.

Specifically, the electronic device may determine, by using one or more sensors of a gravity sensor, an acceleration sensor, and a gyroscope, information such as a folded/unfolded state, a screen orientation, and an included screen angle that are of the electronic device and a change process.

S703: The electronic device displays an incoming video call notification interface on a second screen of a display.

Specifically, for this display manner, refer to the embodiment shown in FIG. 4B. To be specific, when the electronic device in the folded state is displaying the first interface, if the video request from the second application is received, the incoming video call notification interface is displayed on the second screen of the display.

S704: Detect an operation of connecting a video call by a user, and in response to the operation, the electronic device displays a second image on a first screen of the display, and displays a first image on the second screen. Then, step S707 is performed.

The first image is an image of a first user using the electronic device, and the second image is an image of a second user that is in the video call with the first user. Specifically, for this display manner, refer to the embodiment shown in FIG. 4C.

S705: The electronic device displays an incoming video call notification interface in full screen on a display.

Specifically, for the notification interface, refer to the user interface 23 shown in FIG. 3B.

S706: Detect an operation of connecting a video call by a user, and in response to the operation, display a second image in full screen, and display a first image on the second image in a floating manner. Then, step S707 is performed.

Specifically, for this display manner, refer to the embodiment shown in FIG. 3C.

S707: If a first bending operation entered by the user is detected, in response to the first bending operation, the electronic device displays the first interface on the second screen.

Specifically, for this display manner of the electronic device, refer to the embodiments shown in FIG. 3D and FIG. 4D.

S708: If a second bending operation entered by the user is detected, in response to the second bending operation, the electronic device displays a lock screen on the second screen, or enables the second screen to enter a screen-off state.

Specifically, for this display manner of the electronic device, refer to the embodiments shown in FIG. 3E and FIG. 4E.

Figure 8:
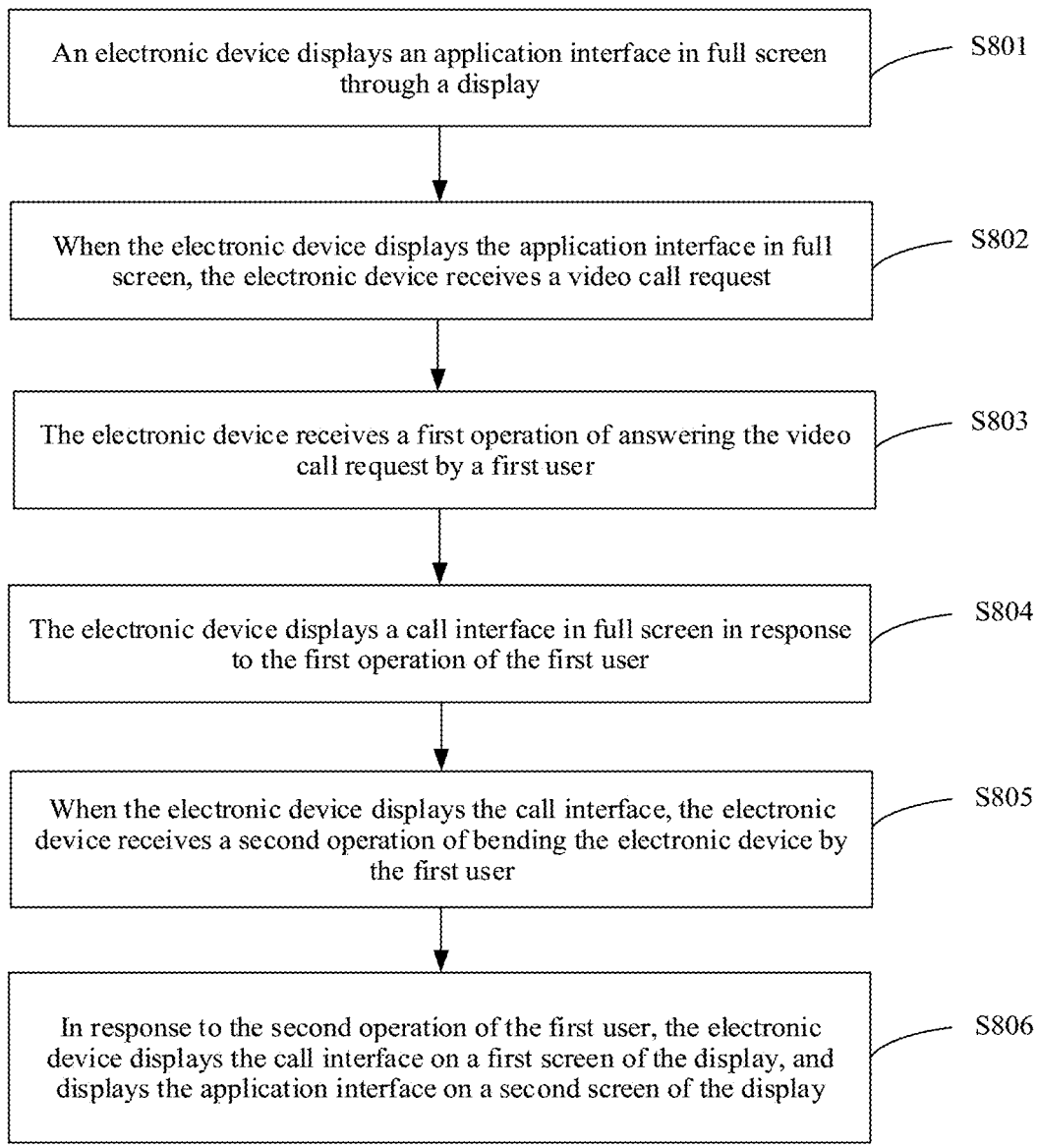
FIG. 8 is a flowchart of another video call display method applied to an electronic device according to an embodiment of this application.

FIG. 8 is a flowchart of another video call display method applied to an electronic device according to an embodiment of this application. Specifically, the electronic device includes a first body, a second body, and a display, the first body is connected to the second body, the first body is bendable relative to the second body, and the display is disposed on the first body and the second body. For such an electronic device, refer to the electronic device shown in FIG. 2A or FIG. 2B. This method shown in FIG. 8 is applicable to an application scenario in which the electronic device receives a video request when displaying an application interface. The method includes but is not limited to the following steps.

S801: The electronic device displays the application interface in full screen through the display.

The application interface may be an interface of various applications, and the application may be any one of a plurality of applications included in the electronic device. For example, the first application may be an instant messaging application such as QQ or WeChat, or may be a social platform application such as Weibo, Twitter, or Facebook, or may be a shopping application such as Taobao or Amazon, or may be a video playback application such as TikTok or YouTube, or the like. This is not limited in this embodiment of this application. For example, for the application interface, refer to the user interface 22 shown in FIG. 3A, or refer to the user interface 41 shown in FIG. 4A.

S802: When the electronic device displays the application interface in full screen, the electronic device receives a video call request.

The video call request may come from an application to which the application interface belongs, or the video call request may come from another application included in the electronic device except the application to which the application interface belongs. This is not limited in this embodiment of this application.

S803: The electronic device receives a first operation of answering the video call request by a first user.

For example, for the first operation, refer to the tap operation performed by the user on the accept control 255 in the embodiment corresponding to FIG. 3B. Alternatively, for the first operation, refer to the operation performed by the user on the accept control 255 in the embodiment corresponding to FIG. 4B.

S804: The electronic device displays a call interface in full screen in response to the first operation of the first user.

For example, for the call interface, refer to the user interface 24 shown in FIG. 3C, or refer to the user interface 43 shown in FIG. 4C. The call interface may include the second image 263, the first image 261, the camera switching control 269, the hang-up control 267, and the voice switching control 265.

S805: When the electronic device displays the call interface, the electronic device receives a second operation of bending the electronic device by the first user.

For example, for the second operation, refer to the first bending operation received by the electronic device in the embodiment corresponding to FIG. 3D, or refer to the first bending operation received by the electronic device in the embodiment corresponding to FIG. 4D.

S806: In response to the second operation of the first user, the electronic device displays the call interface on a first screen of the display, and displays the application interface on a second screen of the display.

For example, for a display manner of the call interface and the application interface, refer to the user interface 25 corresponding to FIG. 3D, or refer to the user interface 44 corresponding to FIG. 4D.

In a possible implementation, after that the electronic device receives a second operation of bending the electronic device by the first user, the method further includes: The electronic device receives a third operation of bending the electronic device by the first user; and in response to the third operation of the first user, the electronic device displays the call interface on the first screen, and displays a lock screen on the second screen. For the third operation, refer to the second bending operation received by the electronic device in the embodiment corresponding to FIG. 3E. For display manners of the call interface and the lock screen, refer to the user interface 26 corresponding to FIG. 3E. Alternatively, for the third operation, refer to the second bending operation received by the electronic device in the embodiment corresponding to FIG. 4E. For display manners of the call interface and the lock screen, refer to the user interface 45 corresponding to FIG. 4E.

In a possible implementation, that the electronic device displays a call interface in full screen includes: If the electronic device is in a folded state, the electronic device displays, on the first screen, a second image of a second user that is in the video call with the first user; and displays, on the second screen, a first image of the first user and a call control used to control the video call. For example, for the call interface, refer to the user interface 43 shown in FIG. 4C.

In a possible implementation, the second operation is bending the electronic device to reduce an included angle between the first body and the second body.

In a possible implementation, before that the electronic device displays the call interface on a first screen of the display, and displays the application interface on a second screen of the display, the method further includes: The electronic device obtains a posture of the first body and a posture of the second body; and the electronic device determines the first screen and the second screen based on the posture of the first body and the posture of the second body.

In a possible implementation, that the electronic device determines the first screen and the second screen based on the posture of the first body and the posture of the second body includes: If a first included angle is greater than a second included angle, the electronic device determines that a display area corresponding to the first body is the first screen, and a display area corresponding to the second body is the second screen. The first included angle is an included angle obtained by rotating a normal of the first body clockwise to a direction of gravity, and the second included angle is an included angle obtained by rotating a normal of the second body clockwise to the direction of gravity. If the second included angle is greater than the first included angle, the electronic device determines that the display area corresponding to the second body is the first screen, and the display area corresponding to the first body is the second screen. For example, for the first included angle, refer to the included angle A in FIG. 2D, and for the second included angle, refer to the included angle B in FIG. 2D.

In a possible implementation, an interval time between the second operation and the third operation is not less than a preset value.

In a possible implementation, before that the electronic device receives a first operation of answering the video call request by a first user, the method further includes: If the electronic device is in the folded state, the electronic device keeps an interface element displayed on the first screen unchanged, and displays an incoming video call notification interface on the second screen. For example, for this display manner, refer to the user interface 42 shown in FIG. 4B. In this manner, an incoming video call notification does not block the application interface displayed on the first screen, and in addition, the user may conveniently process the incoming video call notification on the second screen.

In a possible implementation, after that the electronic device displays the call interface on a first screen of the display, and displays the application interface on a second screen of the display, the method further includes: If no user operation performed on the second screen is detected within a preset time period, and it is determined that the application interface is not a video image being played, the electronic device still displays the call interface on the first screen, and displays the lock screen on the second screen. In this manner, a problem that the electronic device locks a screen on which the video image is being played, so that the user needs to unlock the screen for a plurality of times can be avoided. This improves operation experience of the user.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method comprising:
    displaying an application interface in full screen through a display of an electronic device;
    receiving a video call request while displaying the application interface in full screen;
    receiving, from a first user, a first operation of answering the video call request;
    displaying a call interface in full screen through the display in response to the first operation;
    receiving a second operation of bending the electronic device by the first user while displaying the call interface;
    displaying, in response to detecting that the second operation is a first bending operation after answering the video call request in response to the first operation, the call interface on a first screen of the display and the application interface on a second screen of the display;

receiving a third operation of bending the electronic device by the first user; and displaying, in response to detecting that the third operation is a second bending operation after displaying the application interface on the second screen in response to the second operation, the call interface on the first screen and a lock screen on the second screen.

2. The method of claim 1, wherein after receiving the second operation and displaying the call interface on the first screen and the application interface on the second screen, the method further comprises:

receiving an outward folding operation from the first user; and avoiding locking the second screen in response to the outward folding operation.

3. The method of claim 1, wherein when the electronic device is in a folded state, the method further comprises:

displaying, on the second screen, a first image of the first user and a control for controlling a video call; and displaying, on the first screen, a second image of a second user that is in the video call with the first user.

4. The method of claim 1, wherein the second operation is bending the electronic device to reduce an included angle between a first body of the electronic device and a second body of the electronic device, wherein the first body is coupled to the second body, wherein the first body is bendable relative to the second body, and wherein the display is disposed on the first body and the second body.

5. The method of claim 1, wherein before displaying the call interface on the first screen and the application interface on the second screen, the method further comprises:

obtaining a first posture of a first body of the electronic device and a second posture of a second body of the electronic device, wherein the first body is coupled to the second body, wherein the first body is bendable relative to the second body, and wherein the display is disposed on the first body and the second body; and identifying the first screen and the second screen based on the first posture and the second posture.

6. The method of claim 5, further comprising:

obtaining a first included angle by rotating a first normal of the first body clockwise to a direction of gravity;

obtaining a second included angle by rotating a second normal of the second body clockwise to the direction of gravity;

identifying that the first included angle is greater than the second included angle; and detecting, in response to identifying, that a first display area corresponding to the first body is the first screen and a second display area corresponding to the second body is the second screen.

7. The method of claim 5, further comprising:

obtaining a first included angle by rotating a first normal of the first body clockwise to a direction of gravity;

obtaining a second included angle by rotating a second normal of the second body clockwise to the direction of gravity;

identifying that the second included angle is greater than the first included angle; and detecting, in response to identifying, that a second display area corresponding to the second body is the first screen and a first display area corresponding to the first body is the second screen.

8. An electronic device comprising:

a first body;

a second body coupled to the first body, wherein the first body is bendable relative to the second body; and a display disposed on the first body and the second body and comprising:

a first screen; and a second screen, wherein the first body and the second body comprise:

one or more memories configured to store computer instructions; and one or more processors coupled to the one or more memories, wherein when executed by the one or more processors, the computer instructions cause the electronic device to:

display an application interface in full screen through the display;

receive a video call request while displaying the application interface in full screen;

receive, from a first user, a first operation of answering the video call request;

display a call interface in full screen through the display in response to the first operation;

receive, a second operation of bending the electronic device by the first user while displaying the call interface;

display, in response to detecting that the second operation is a first bending operation after answering the video call request in response to the first operation, the call interface on the first screen and the application interface on the second screen;

receive a third operation of bending the electronic device by the first user; and display, in response to detecting that the third operation is a second bending operation after displaying the application interface on the second screen in response to the second operation, the call interface on the first screen and a lock screen on the second screen.

9. The electronic device of claim 8, wherein when executed by the one or more processors, the computer instructions further cause the electronic device to:

receive an outward folding operation from the first user; and avoid locking the second screen in response to the outward folding operation.

10. The electronic device of claim 8, wherein when the electronic device is in a folded state and when executed by the one or more processors, the computer instructions further cause the electronic device to:

display, on the second screen, a first image of the first user and a call control controlling a video call; and display, on the first screen, a second image of a second user that is in the video call with the first user.

11. The electronic device of claim 8, wherein the second operation is bending the electronic device to reduce an included angle between the first body and the second body.

12. The electronic device of claim 8, wherein when executed by the one or more processors, the computer instructions further cause the electronic device to:

obtain a first posture of the first body and a second posture of the second body; and identify the first screen and the second screen based on the first posture and the second posture.

13. The electronic device of claim 12, wherein when executed by the one or more processors, the computer instructions further cause the electronic device to:

obtain a first included angle by rotating a first normal of the first body clockwise to a direction of gravity;

obtain a second included angle by rotating a second normal of the second body clockwise to the direction of gravity;
identify that the first included angle is greater than the second included angle; and
detect, in response to identifying, that a first display area corresponding to the first body is the first screen and a second display area corresponding to the second body is the second screen.

14. The electronic device of claim 12, wherein when executed by the one or more processors, the computer instructions further cause the electronic device to:
obtain a first included angle by rotating a first normal of the first body clockwise to a direction of gravity;
obtain a second included angle by rotating a second normal of the second body clockwise to the direction of gravity;
identify that the second included angle is greater than the first included angle; and
detect, in response to identifying, that a second display area corresponding to the second body is the first screen and a first display area corresponding to the first body is the second screen.

15. A computer program product comprising computer-executable instructions that are stored on a non-transitory computer-readable medium and that, when executed by a processor, cause an electronic device to:
display an application interface in full screen through a display of the electronic device;
receive a video call request while displaying the application interface in full screen;
receive, from a first user, a first operation of answering the video call request;
display a call interface in full screen through the display in response to the first operation;
receive, a second operation of bending the electronic device by the first user while displaying the call interface;
display, in response to detecting that the second operation is a first bending operation after answering the video call request in response to the first operation, the call interface on a first screen of the display and the application interface on a second screen of the display;
receive a third operation of bending the electronic device by the first user; and
display, in response to detecting that the third operation is a second bending operation after displaying the application interface on the second screen in response to the second operation, the call interface on the first screen and a lock screen on the second screen.

16. The computer program product of claim 15, wherein when the electronic device is in a folded state, the computer-executable instructions further cause the electronic device to:
display, on the second screen, a first image of the first user and a call control controlling a video call; and
display, on the first screen, a second image of a second user that is in the video call with the first user.

17. The computer program product of claim 15, wherein the second operation is bending the electronic device to reduce an included angle between a first body of the electronic device and a second body of the electronic device, wherein the first body is coupled to the second body, wherein the first body is bendable relative to the second body, and wherein the display is disposed on the first body and the second body.

18. The computer program product of claim 15, wherein the computer-executable instructions further cause the electronic device to:
obtain a first posture of a first body of the electronic device and a second posture of a second body of the electronic device, wherein the first body is coupled to the second body, wherein the first body is bendable relative to the second body, and wherein the display is disposed on the first body and the second body; and
identify the first screen and the second screen based on the first posture and the second posture.

19. The computer program product of claim 18, wherein the computer-executable instructions further cause the electronic device to:
obtain a first included angle by rotating a first normal of the first body clockwise to a direction of gravity;
obtain a second included angle by rotating a second normal of the second body clockwise to the direction of gravity;
identify that the first included angle is greater than the second included angle; and
detect, in response to identifying, that a first display area corresponding to the first body is the first screen and a second display area corresponding to the second body is the second screen.

20. The computer program product of claim 18, wherein the computer-executable instructions further cause the electronic device to:
obtain a first included angle by rotating a first normal of the first body clockwise to a direction of gravity;
obtain a second included angle by rotating a second normal of the second body clockwise to the direction of gravity;
identify that the second included angle is greater than the first included angle; and
detect, in response to identifying, that a second display area corresponding to the second body is the first screen and a first display area corresponding to the first body is the second screen.

* * * * *

UNITED STATES PATENT AND TRADEMARK OFFICE
CERTIFICATE OF CORRECTION

| | | |
|---|---|---|
| PATENT NO. | : 12,147,273 B2 | Page 1 of 1 |
| APPLICATION NO. | : 17/631190 | |
| DATED | : November 19, 2024 | |
| INVENTOR(S) | : Haowei Liang | |

It is certified that error appears in the above-identified patent and that said Letters Patent is hereby corrected as shown below:

On the Title Page

Page 2, item [56] "IN 109218648 A 1/2019" should read "CN 109218648 A 1/2019"

Page 2, item [56] "IN 109542548 A 3/2019" should read "CN 109542548 A 3/2019"

Signed and Sealed this
Thirty-first Day of December, 2024

Derrick Brent
*Acting Director of the United States Patent and Trademark Office*